United States Patent
Åström et al.

(10) Patent No.: US 11,382,038 B2
(45) Date of Patent: Jul. 5, 2022

(54) CONFIGURATION OF WAKE-UP SIGNAL MAXIMUM TRANSMISSION LENGTHS

(71) Applicant: Telefonaktiebolaget LM Ericsson (publ), Stockholm (SE)

(72) Inventors: Magnus Åström, Lund (SE); Santhan Thangarasa, Vällingby (SE); Yutao Sui, Solna (SE); Johan Bergman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 99 days.

(21) Appl. No.: 16/967,329

(22) PCT Filed: Feb. 19, 2019

(86) PCT No.: PCT/SE2019/050152
§ 371 (c)(1),
(2) Date: Aug. 4, 2020

(87) PCT Pub. No.: WO2019/168455
PCT Pub. Date: Sep. 6, 2019

(65) Prior Publication Data
US 2021/0037469 A1 Feb. 4, 2021

Related U.S. Application Data

(60) Provisional application No. 62/635,844, filed on Feb. 27, 2018.

(51) Int. Cl.
*H04W 52/02* (2009.01)
*H04W 56/00* (2009.01)
(Continued)

(52) U.S. Cl.
CPC ..... *H04W 52/0229* (2013.01); *H04W 52/028* (2013.01); *H04W 56/001* (2013.01); *H04W 68/005* (2013.01); *H04W 76/28* (2018.02)

(58) Field of Classification Search
CPC ............. H04W 52/0229; H04W 76/28; H04W 52/028; H04W 56/001; H04W 68/005
(Continued)

(56) References Cited

FOREIGN PATENT DOCUMENTS

WO WO-2019126297 A1 * 6/2019 .......... H04W 52/146

OTHER PUBLICATIONS

R1-1802163 (Year: 2018).*
(Continued)

*Primary Examiner* — Yemane Mesfin
*Assistant Examiner* — Intekhaab A Siddiquee
(74) *Attorney, Agent, or Firm* — Christopher & Weisberg. P.A.

(57) ABSTRACT

Systems and methods for transmission and reception of a wake-up signal having a determined maximum length that is related to a maximum repetition value of another signal are disclosed. Embodiments of a method in a wireless device for determining a maximum length of a wake-up signal representing a maximum duration of the wake-up signal, the WUSmax value being related to a maximum repetition value representing a maximum number of repetitions of signals transmitted by a network node in a cellular communications network are disclosed. In some embodiments, the method in the wireless device includes receiving a Rmax value from the network node, determining a WUSmax value based on the Rmax value, and attempting to detect a wake-up signal from the network node using the determined WUSmax value.

18 Claims, 15 Drawing Sheets

(51) Int. Cl.
*H04W 68/00* (2009.01)
*H04W 76/28* (2018.01)

(58) Field of Classification Search
USPC .......................................................... 370/329
See application file for complete search history.

(56) References Cited

OTHER PUBLICATIONS

R1-1802332 (Year: 2018).*
R1-1802263 (Year: 2018).*
62609178P (Year: 2018).*
International Search Report and Written Opinion dated Apr. 29, 2019 for International Application No. PCT/SE2019/050152 filed on Feb. 19, 2019, consisting of 14-pages.
3GPP TSG RAN WG4 Meeting #81 R4-1610330; Title: On UE Cat M1 requirements in DRX; Agenda Item: 5.5.3; Source: Ericsson; Document for: Discussion; Date and Location: Nov. 10-18, 2016, Reno, Nevada, consisting of 2-pages.
3GPP TSG RAN WG1 Meeting #92 R1-1802331; Title: Further Discussion on Wake-up signal functions; Agenda Item: 6.2.6.1.1.1; Source: Qualcomm Incorporated; Document for: Discussion and Decision: Date and Location: Feb. 26-Mar. 2, 2018, Athens, Greece, consisting of 7-pages.
3GPP TSG RAN WG1 Meeting #91 R1-1720157; Title: Enhanced PSS Analysis Agenda Item: 6.2.5.1 Reduced system acquisition time; Source: Sierra Wireless; Document for: Discussion and Decision; Date and Location: Nov. 27-Dec. 1, 2017; Reno, USA, consisting of 8-pages.
3GPP TSG RAN WG1 Meeting #91 R1-1720465; Title: MTC Synchronisation Signal evaluations for efeMTC; Agenda Item: 6.2.5.1; Source: Sony; Document for: Discussion and Decision; Date and Location: Date and Location Nov. 27-Dec. 1, 2017; Reno, USA, consisting of 6-pages.
3GPP TSG RAN WG1 Meeting #92 R1-1801481; Title: Reduced system acquisition time for MTC; Agenda Item: 6.2.5.1; Source: Ericsson; Document for: Discussion and Decision; Date and Location: Feb. 26-Mar. 2, 2018, Athens, Greece, consisting of 9-pages.
3GPP TSG RAN WG1 Meeting #92 R1-1801483; Title: Downlink channel power efficiency for MTC; Agenda Item: 6.2.5.3; Source: Ericsson; Document for: Discussion and Decision; Date and Location: Feb. 26-Mar. 2, 2018, Athens, Greece, consisting of 13-pages.
3GPP TSG RAN WG1 Meeting #92 R1-1801489; Title: Wake-up signal configurations and procedures for NB-IoT; Agenda Item: 6.2.6.1.1.2; Source: Ericsson; Document for: Discussion and Decision; Date and Location: Feb. 26-Mar. 2, 2018, Athens, Greece, consisting of 9-pages.
3GPP TSG RAN WG1 Meeting #92 R1-1802163; Title: Discussion on wake up signal in MTC; Agenda Item: 6.2.5.3; Source: LG Electronics; Document for: Discussion and Decision; Date and Location: Feb. 26-Mar. 2, 2018, Athens, Greece, consisting of 8-pages.
3GPP TSG RAN2 Meeting #101 R2-1802586; Title: Wake Up Signal in NB-IoT and MTC; Agenda Item: 9.13.9 Wake Up Signal; Source: Ericsson; Document for: Discussion and Decision; Date and Location: Feb. 26-Mar. 2, 2018, Athens, Greece, consisting of 11-pages.
EPO Communication and Search Report dated Jan. 20, 2022 for Patent Application No. 19760998.5, consisting of 11-pages.
Indian Office Action dated Nov. 30, 2021 for Patent Application No. 202017038042, consisting of 6-pages.
3GPP TSG RAN WG1 Meeting #92 R1-1801504; Title: On wake-up signals for efeMTC; Agenda Item: 6.2.5.3; Source: Vivo; Document for: Discussion and decision; Date and Location: Feb. 26-Mar. 2, 2018, Athens, Greece, consisting of 4-pages.

* cited by examiner

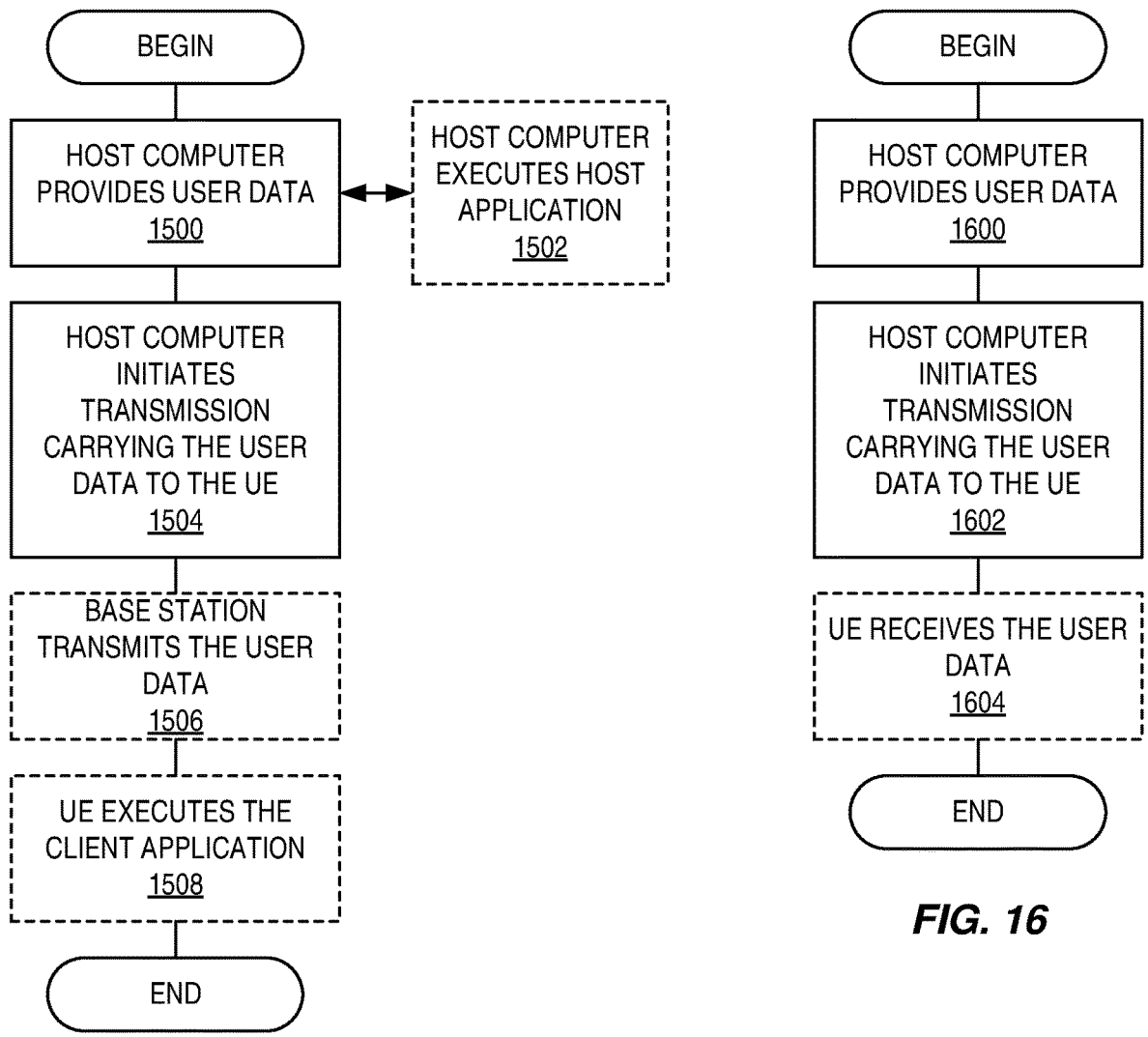

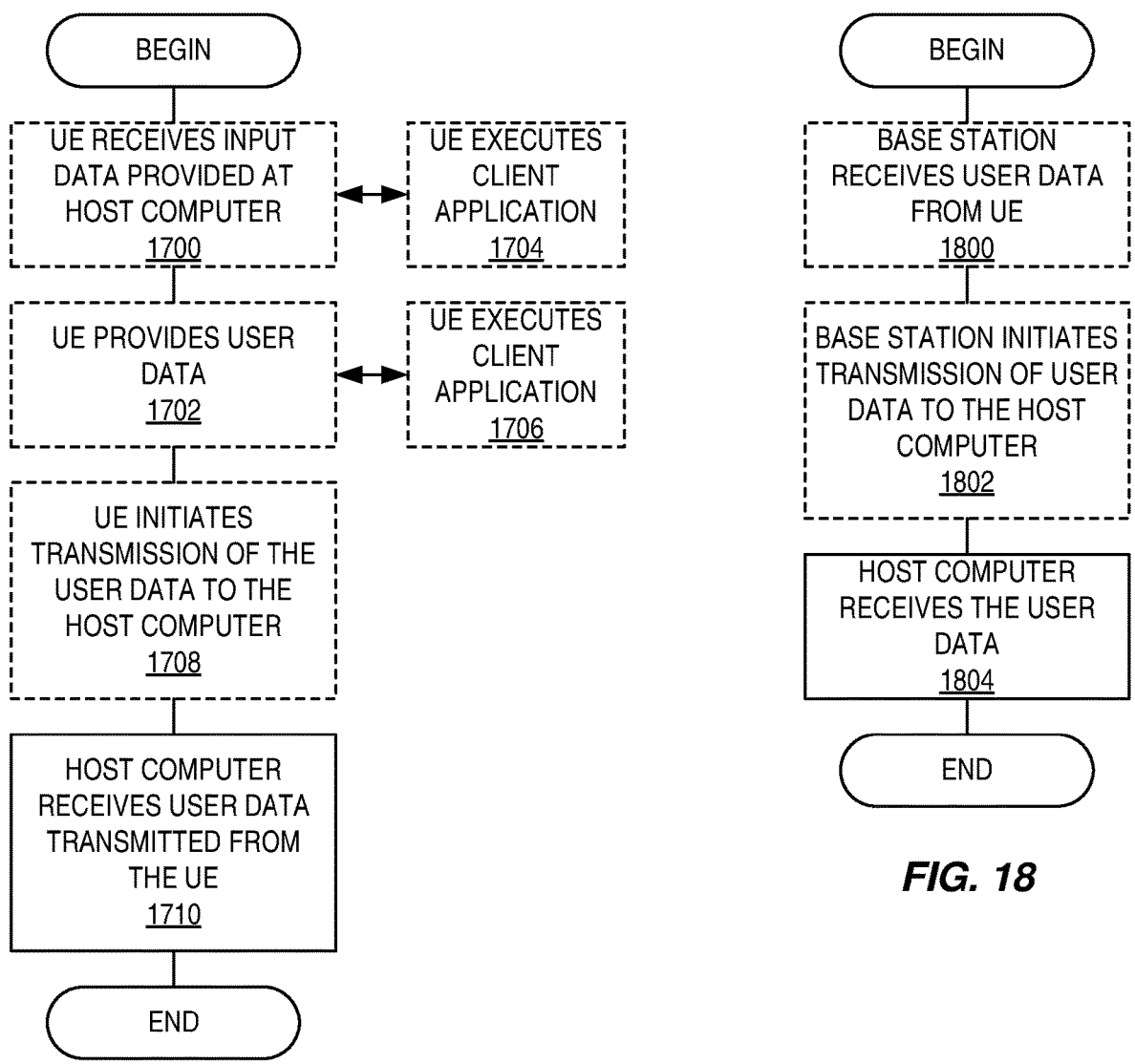

CONFIGURATION OF WAKE-UP SIGNAL MAXIMUM TRANSMISSION LENGTHS

CROSS-REFERENCE TO RELATED APPLICATIONS

This application is a Submission Under 35 U.S.C. § 371 for U.S. National Stage Patent Application of International Application No.: PCT/SE2019/050152, filed Feb. 19, 2019 entitled "CONFIGURATION OF WAKE-UP SIGNAL MAXIMUM TRANSMISSION LENGTHS," which claims priority to U.S. Provisional Application No. 62/635,844, filed Feb. 27, 2018, entitled "CONFIGURATION OF WAKE-UP SIGNAL MAXIMUM TRANSMISSION LENGTHS," the entireties of both of which are incorporated herein by reference.

TECHNICAL FIELD

The present disclosure relates to a wireless communication system and, in particular, to a wake-up signal in a wireless communication system.

BACKGROUND

There has been a lot of work in Third Generation Partnership Project (3GPP) lately on specifying technologies to cover Machine-to-Machine (M2M) and/or Internet of Things (IoT) related use cases. Most recent work for 3GPP Releases 13 and 14 includes enhancements to support Machine Type Communications (MTC) with new User Equipment device (UE) categories (Cat-M1, Cat-M2), supporting reduced bandwidth of six Physical Resource Blocks (PRBs) (up to 24 PRBs for Cat-M2), and Narrowband IoT (NB-IoT) UEs providing a new radio interface (and UE categories, Cat-NB1 and Cat-NB2).

The Long Term Evolution (LTE) enhancements introduced in 3GPP Releases 13, 14, and 15 for MTC are referred to herein as "enhanced MTC (eMTC)," including (not limiting) support for bandwidth limited UEs, Cat-M1, and support for coverage enhancements. This is to separate the discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the Physical Downlink Control Channels (PDCCHs), called MTC Physical Downlink Control Channel (MPDCCH) in eMTC and Narrowband Physical Downlink Control Channel (NPDCCH) in NB-IoT, and a new Physical Random Access Channel (PRACH), Narrowband Physical Random Access Channel (NPRACH), for NB-IoT. Another important difference is the coverage level (also known as Coverage Enhancement (CE) level) that these technologies can support. By applying repetitions to the transmitted signals and channels, both eMTC and NB-IoT allow UE operation down to much lower Signal to Noise Ratio (SNR) levels compared to LTE, i.e. Es/Iot≥−15 decibels (dB) being the lowest operating point for eMTC and NB-IoT which can be compared to −6 dB Es/Iot for "legacy" LTE.

In Release 15, there is a common Work Item (WI) objective in the approved WIs for both NB-IoT and Release 15 enhancements for eMTC. The description for NB-IoT is as follows:

A. Work on the following objectives to commence from RAN #75 (according to TU allocation per WG) and strive for completion by RAN #78:
 Further Latency and Power Consumption Reduction
 Power consumption reduction for physical channels
  Study and, if found beneficial, specify for idle mode paging and/or connected mode DRX, physical signal/channel that can be efficiently decoded or detected prior to decoding NPDCCH/NPDSCH. [RAN1, RAN2, RAN4]
And with a similar formulation for eMTC:
Improved power consumption:
Power consumption reduction for physical channels [RAN1 lead, RAN2, RAN4]
 Study and, if found beneficial for idle mode paging and/or connected mode DRX, specify physical signal/channel that can be efficiently decoded or detected prior to decoding the physical downlink control/data channel.
So far, the topic has been discussed in two Radio Access Network Working Group 1 (RAN1) meetings and most recently in RAN1 #89 where it was agreed for both NB-IoT and eMTC that:
 A physical signal/channel indicating whether the UE needs to decode subsequent physical [control] channel(s) is introduced, at least for idle mode paging.
  Candidates for the signal/channel are:
  Wake-Up Signal (WUS) or Discontinuous Transmission (DTX)
  Go-To-Sleep Signal (GTS) or DTX
  WUS with no DTX
  Downlink control information
  For Further Study (FFS) whether synchronization to the camped-on cell is assumed for detecting/decoding WUS/GTS, depending on the (extended) Discontinuous Reception ((e)DRX) cycle length
  Design details are FFS
 Connected mode DRX is FFS
The 'Wake-Up Signal' and 'Go-To-Sleep Signal' solutions are based on the transmission of a short signal which would indicate to the UE whether or not it would have to continue to decode the full MPDCCH (eMTC) or NPDCCH (NB-IoT). The decoding time for the former signal is considerably shorter than full MPDCCH or NPDCCH which gives a reduced UE power consumption and longer battery life, as presented in R1-1706887. The WUS would be transmitted only when there is paging for the UE; if there is not paging for the UE, the WUS will not be transmitted (i.e., the meaning of DTX in the above agreement) and the UE would go back to sleep. The GTS would be transmitted only when there is not any paging for the UE; if there is paging for the UE, the GTS will not be transmitted (the meaning of DTX in the above agreement) and the UE would continue to decode NPDCCH or MPDCCH.

In RAN1 #90 the following working assumption was agreed:
 For idle mode,
  In specifying a power saving physical signal to indicate whether the UE needs to decode subsequent physical channel(s) for idle mode paging, select a candidate among the following power saving physical signals:
   WUS or DTX
   WUS with no DTX
Cell coverage in both eMTC and NB-IoT is controlled by the maximum number of repetitions, Rmax, that a message may be transmitted with. The Rmax values may be defined in values from 1 to 2048, where the next value is a doubling of the previous one. The coverage of a specific number of repetitions, R, is not only dependent on R, but also on the message size, since a longer message typically requires a higher R compared to a shorter message, provided the same coverage. Paging messages using the xPDCCH, where xPDCCH denotes MPDCCH for eMTC and NPDCCH for NB-IoT, are typically the same size (not the same number of repetitions of that message, though) for a given cell, providing a constant maximum coverage.

The WUS is a new signal that is being defined in Release 15. The WUS gives rise to new challenges that must be addressed.

SUMMARY

Systems and methods for transmission and reception of a wake-up signal having a determined maximum length that is related to a maximum repetition value of another signal are disclosed. Embodiments of a method in a wireless device for determining a maximum length of a wake-up signal (WUSmax value) representing a maximum duration of the wake-up signal, the WUSmax value being related to a maximum repetition value (Rmax value) representing a maximum number of repetitions of signals transmitted by a network node in a cellular communications network are disclosed. In some embodiments, the method in the wireless device comprises receiving a Rmax value from the network node, determining a WUSmax value based on the Rmax value, and attempting to detect a wake-up signal from the network node using the determined WUSmax value. In this manner, the signaling cost for WUSmax can be reduced and thereby save valuable network resources.

In some embodiments, the wake-up signal is a signal that indicates to the wireless device that the wireless device is to continue to decode a respective channel.

In some embodiments, the Rmax value defines a maximum number of repetitions used by the network node when transmitting a physical downlink control channel. Further, in some embodiments, the wireless device is a Machine Type Communication (MTC) device, and the physical downlink control channel is a MTC Physical Downlink Control Channel (MPDCCH). In some other embodiments, the wireless device is a Narrowband Internet of Things (NB-IoT) device, and the physical downlink control channel is a Narrowband Physical Downlink Control Channel (NPDCCH).

In some embodiments, determining the WUSmax value based on the Rmax value comprises determining the WUSmax value from the Rmax value by a mathematical function. In some embodiments, the mathematical function is predefined.

In some embodiments, determining the WUSmax value based on the Rmax value comprises determining the WUSmax value from the Rmax value by a table lookup. In some embodiments, the table lookup uses a predefined table.

In some embodiments, the method further comprises receiving a wake-up signal delta value (WUSdelta value) from the network node. Further, in some embodiments, determining the WUSmax value based on the Rmax value comprises determining the WUSmax value based on the Rmax value and the WUSdelta value.

In some embodiments, determining the WUSmax value based on the Rmax value comprises determining the WUSmax value from the Rmax value and the WUSdelta value by a mathematical function. Further, in some embodiments, the mathematical function is predefined.

In some embodiments, determining the WUSmax value based on the Rmax value comprises determining the WUSmax value from the Rmax value and the WUSdelta value by a table lookup. In some embodiments, the table lookup uses a predefined table.

In some embodiments, determining the WUSmax value based on the Rmax value comprises determining the WUSmax value from the Rmax value and the WUSdelta value such that the WUSmax value is changed from a previous WUSmax value if the WUSdelta value is actually received.

Embodiments of a wireless device for determining a WUSmax value representing a maximum duration of a wake-up signal, the WUSmax value being related to a Rmax value representing a maximum number of repetitions of signals transmitted by a network node in a cellular communications network, are also disclosed. In some embodiments, the wireless device is adapted to receive a Rmax value from the network node, determine a WUSmax value based on the Rmax value, and attempt to detect a wake-up signal from the network node using the determined WUSmax value.

In some embodiments, the wireless device comprises one or more receivers and processing circuitry associated with the one or more receivers, wherein the processing circuitry is configured to cause the wireless device to receive a Rmax value from the network node, determine a WUSmax value based on the Rmax value, and attempt to detect a wake-up signal from the network node using the determined WUSmax value.

Embodiments of a method in a wireless device for determining a synchronization method to be used by the wireless device in a cellular communications network are also disclosed. In some embodiments, the method in the wireless device comprises receiving a Rmax value from a network node, the Rmax value representing a maximum number of repetitions of signals transmitted by the network node in the cellular communications network. The method further comprises receiving a WUSdelta value from the network node, wherein a WUSmax value that represents a maximum duration of a wake-up signal is based on the Rmax value and the WUSdelta value. The method further comprises determining a synchronization method to be used by the wireless device based on the Rmax value and the WUSdelta value, and attempting to synchronize to the cellular communications network using the determined synchronization method.

In some embodiments, the wake-up signal is a signal that indicates to the wireless device that the wireless device is to continue to decode a respective channel.

In some embodiments, the Rmax value defines a maximum number of repetitions used by the network node when transmitting a physical downlink control channel. Further, in some embodiments, the wireless device is an MTC device, and the physical downlink control channel is a MPDCCH. In some other embodiments, the wireless device is a NB-IoT device, and the physical downlink control channel is a NPDCCH.

In some embodiments, determining the synchronization method to be used by the wireless device based on the Rmax value and the WUSdelta value comprises determining the WUSmax value based on the Rmax value and the WUSdelta value where the WUSmax value representing a maximum duration of a wake-up signal, and determining the synchronization method to be used by the wireless device based on a comparison of the WUSmax value to a threshold. Further, in some embodiments, determining the synchronization method to be used by the wireless device based on a comparison of the WUSmax value to a threshold comprises comparing the WUSmax value to the threshold, determining that a wake-up signal can be used for synchronization if the WUSmax value is greater than the threshold, and otherwise determining that another synchronization method is to be used. Further, in some embodiments, the other synchronization method is a wake-up signal independent synchronization method. In some embodiments, the threshold is a function of a Discontinuous Reception (DRX) or extended DRX (eDRX) cycle. In some embodiments, the threshold is a function of a DRX or eDRX cycle such that a shorter DRX or eDRX cycle results in a lower threshold and a longer DRX or eDRX cycle results in a higher threshold.

Embodiments of a wireless device for determining a synchronization method to be used by the wireless device in a cellular communications network are also disclosed. In some embodiments, the wireless device is adapted to receive a Rmax value from a network node where the Rmax value represents a maximum number of repetitions of signals transmitted by the network node in the cellular communications network, receive a WUSdelta value from the network node wherein a WUSmax value for a wake-up signal is based on the Rmax value and the WUSdelta value, determine a synchronization method to be used by the wireless device based on the Rmax value and the WUSdelta value, and attempt to synchronize to the cellular communications network using the determined synchronization method.

In some other embodiments, the wireless device comprises one or more receivers and processing circuitry associated with the one or more receivers, wherein the processing circuitry is configured to cause the wireless device to receive a Rmax value from a network node where the Rmax value represents a maximum number of repetitions of signals transmitted by the network node in the cellular communications network, receive a WUSdelta value from the network node wherein a WUSmax value for a wake-up signal is based on the Rmax value and the WUSdelta value, determine a synchronization method to be used by the wireless device based on the Rmax value and the WUSdelta value, and attempt to synchronize to the cellular communications network using the determined synchronization method.

Embodiments of a method in a network node for efficiently transmitting information of a wake-up signal maximum length, related to a maximum repetition factor used for other signals, are also disclosed. In some embodiments, the method comprises determining a default WUSmax value related to a Rmax value used for other signals, and transmitting a wake-up signal using the determined WUSmax value as limiting a number of repetitions of the wake-up signal that are transmitted.

In some embodiments, the wake-up signal is a signal transmitted by the network node to indicate to a wireless device that the wireless device is to continue to decode a respective channel. Further, in some embodiments, the respective channel is a physical downlink control channel, and the Rmax value defines a maximum number of repetitions used by the network node when transmitting the physical downlink control channel. Further, in some embodiments, the wireless device is an MTC device, and the physical downlink control channel is a MPDCCH. In some other embodiments, the wireless device is a NB-IoT device, and the physical downlink control channel is a NPDCCH.

In some embodiments, a default wake-up signal coverage is determined from the default WUSmax value and a preferred wake-up signal coverage is different from the default wake-up signal coverage. In some embodiments, the method further comprises determining the preferred wake-up signal coverage.

In some embodiments, the method further comprises determining, based on the preferred wake-up signal coverage, at least one WUSdelta value related to the default wake-up signal coverage. Further, in some embodiments, the method further comprises transmitting the at least one WUSdelta value in system information of the network node.

In some embodiments, determining the WUSdelta value comprises determining the WUSdelta value from the Rmax value by a mathematical formula. In some embodiments, the mathematical formula is predefined.

In some embodiments, determining the WUSdelta value comprises determining the WUSdelta value from the Rmax value by table lookup. In some embodiments, the table lookup uses a predefined table.

In some embodiments, transmitting the wake-up signal comprises transmitting the wake-up signal using a WUSmax value determined based on the default WUSmax value and the WUSdelta value as limiting a number of repetitions of the wake-up signal that are transmitted.

In some embodiments, determining the default WUSmax value comprises determining the default WUSmax value from the Rmax value by mathematical formula. In some embodiments, the mathematical formula is predefined.

In some embodiments, determining the default WUSmax value comprises determining the default WUSmax value from the Rmax value by table lookup. In some embodiments, the table lookup uses a predefined table. In some embodiments, the WUSdelta value indicates a deviation from the predefined table.

In some embodiments, the preferred wake-up signal coverage is increased due to User Equipments (UEs) using a specific low performance wake-up radio.

Embodiments of a network node for efficiently transmitting information of a wake-up signal maximum length, related to a maximum repetition factor used for other signals, are disclosed. In some embodiments, the network node is adapted to determine a default WUSmax value related to a Rmax value used for other signals and transmit a wake-up signal using the determined WUSmax value as limiting a number of repetitions of the wake-up signal that are transmitted.

In some other embodiments, the network node comprises processing circuitry configured to cause the network node to determine a default WUSmax value related to a Rmax value used for other signals, and transmit a wake-up signal using the determined WUSmax value as limiting a number of repetitions of the wake-up signal that are transmitted.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15 through 18 are flow charts that illustrate example methods in the communication system of FIGS. 13 and 14 in accordance with some embodiments of the present disclosure.

DETAILED DESCRIPTION

Figure 1:
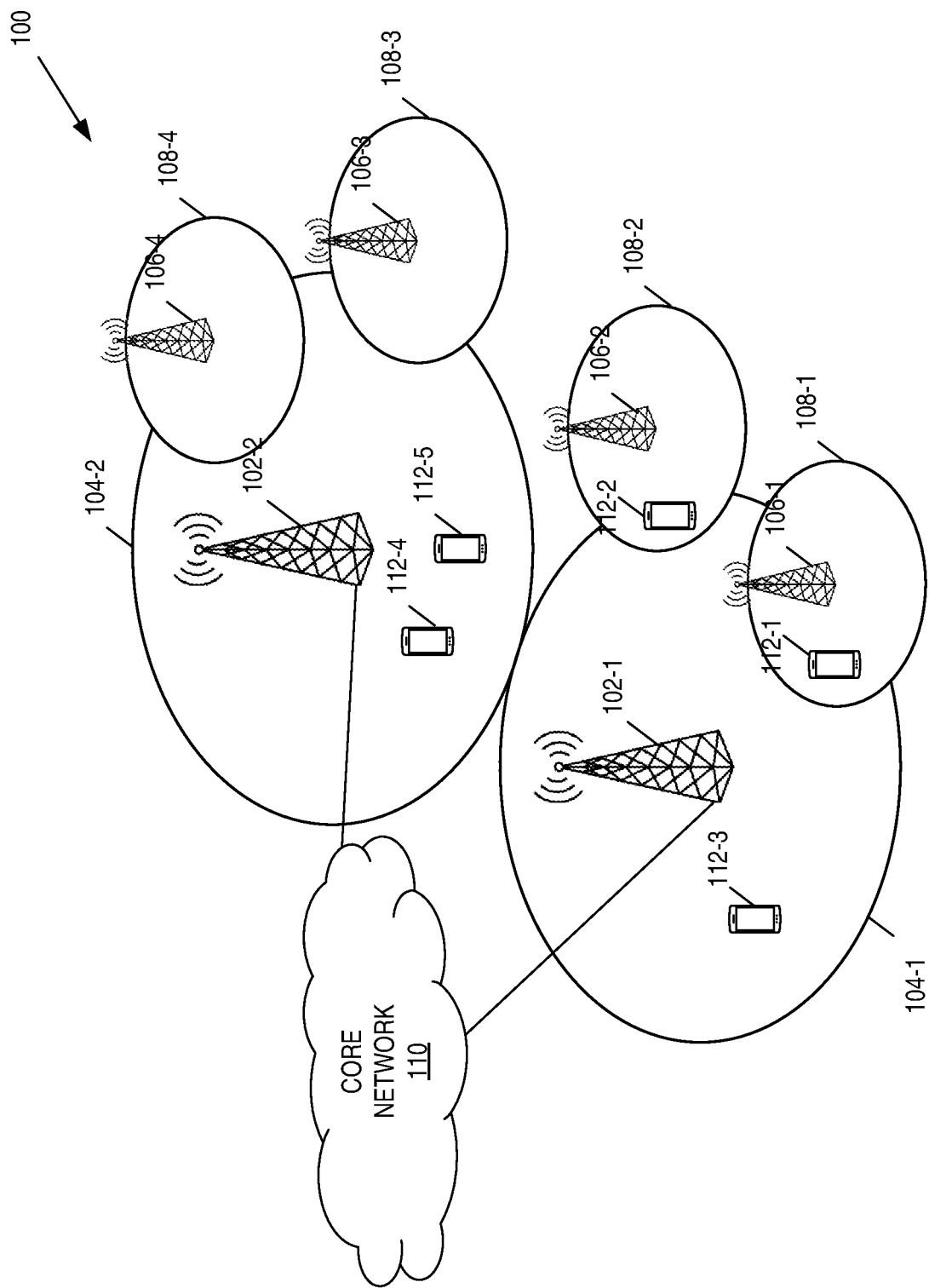
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). As discussed above, the Wake-Up Signal (WUS) is a new signal that is being defined in 3GPP Release 15. The WUS is supposed to work together with the xPDCCH, where "xPDCCH" is used herein to denote the MTC Physical Downlink Control Channel (MPDCCH) in enhanced Machine Type Communication (eMTC) and the Narrowband Physical Downlink Control Channel (NPDCCH) in Narrowband Internet of Things (NB-IoT). Further, since the WUS is supposed to work together with the xPDCCH, the coverage of the WUS is hence required to be similar to that of the xPDCCH signals since the UE needs to decode the WUS in order to know whether to fully decode the xPDCCH. Control channel (e.g., xPDCCH) coverage in both eMTC and NB-IoT is achieved by repetitions, where the maximum number of repetitions is transmitted (i.e., signaled) as Rmax. Since the WUS is a much smaller signal, using Rmax as the maximum number of repetitions of the WUS implies a substantially larger coverage for the WUS as compared to that of the xPDCCH and unnecessary overhead as a result. Therefore, the Rmax is ill suited for the WUS as the maximum length of the WUS. Using the same Rmax for the WUS may also lead to coverage mismatch between the different channels. Hence, there is a need for an efficient signaling of a WUSmax value (i.e., a maximum length of a WUS) such that WUS coverage can be matched to the xPDCCH coverage as defined by Rmax.

Certain aspects of the present disclosure and their embodiments may provide solutions to the aforementioned or other challenges. In the present disclosure, a method of relating the WUS configuration with the current Rmax configuration used for paging is proposed. The method is applied both on the network node and the wireless device.

The main step in the network embodiment is to determine the WUSmax, which is based on a number of steps involving, in some embodiments, a network node determining a default WUSmax, a preferred WUS coverage, and relating it to Rmax. The network node may apply certain rules or follow a certain predefined table to determine the WUSmax. The network node may then transmit WUS signals according to the determined WUSmax. In addition, the network node may signal the WUSmax to the wireless devices in its cell, e.g., by broadcasting or providing in system information.

The main step in the wireless device is that the wireless device (e.g., the UE) uses the received information in attempting to decode the WUS. More specifically, the wireless device keeps trying to decode the WUS until it has reached the WUSmax number of repetitions. However, if the wireless device has succeeded to decode the WUS earlier than it has reached WUSmax, it may switch off its receiver.

The core essence of this solution is to add configuration possibilities for paging the WUS in order for the network to configure it such that it would always result in wireless device power consumption reduction and not the opposite.

Certain embodiments may provide one or more of the following technical advantage(s). In the present disclosure, an efficient method of relating the WUS configuration with the current Rmax configuration used for paging is proposed. In this way, the signaling cost for WUSmax can be reduced and thereby save valuable network resources. These savings are particularly important since they need to be transmitted either with Rmax repetitions to cover the whole cell, or repeatedly to all UEs individually. Since WUSmax and Rmax both aim for similar coverage, they are clearly related. However, different wireless devices may have different WUS performance from using different low power WUS radio designs, which is why some flexibility is still warranted.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 illustrates one example of a cellular communications network 100 according to some embodiments of the present disclosure. In the embodiments described herein, the cellular communications network 100 is a 3GPP network (e.g., a LTE or 5G NR network). In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
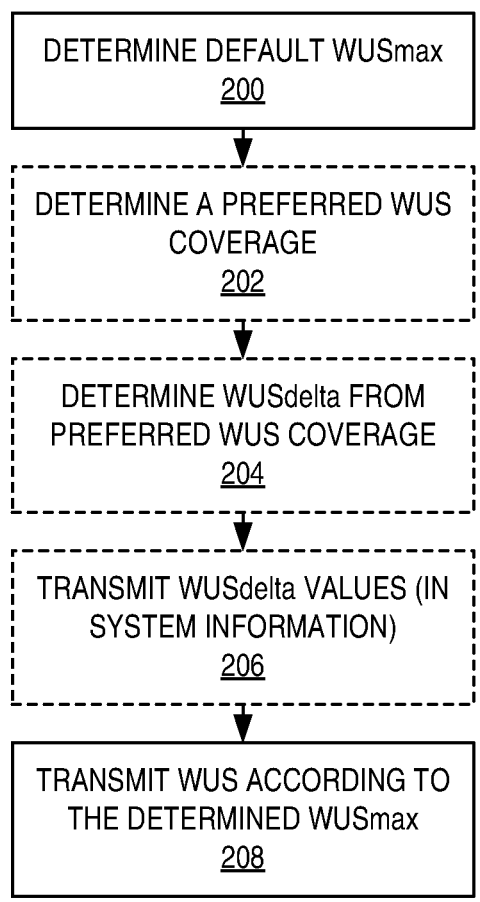
FIG. 2 illustrates a method in a network node for efficiently providing information to a wireless device of a Wake-Up Signal (WUS) maximum length (WUSmax) related to a maximum repetition factor (Rmax) used for other signals in accordance with some embodiments of the present disclosure.

One aspect of the present disclosure is a method in a network node (e.g., a base station 102 or low power node 106) for efficiently providing information to a wireless device (e.g., a wireless device 112) of a WUS maximum length, WUSmax, related to a maximum repetition factor, Rmax, used for other signals, see FIG. 2. Optional steps are represented by dashed lines.

In a first step (step 200), the network node determines a default WUSmax value related to the Rmax. The default WUSmax value can be the starting value. In one example, the default WUSmax value can be the same as the Rmax value, where the Rmax value represents the maximum number of repetitions of another signal(s) transmitted by the network node. In particular, in the preferred embodiments disclosed herein, the Rmax value represents the maximum number of repetitions of MPDCCH for eMTC or the maximum number of repetitions of NPDCCH for NB-IoT. Second, the network node transmits at least one WUS, the number of repetitions of which is limited by the determined WUSmax value (step 208).

In one embodiment which may be optional, a preferred WUS coverage is determined, where the preferred WUS coverage for the WUS is different from the default WUS coverage (step 202). Herein, the preferred WUS coverage means the level of coverage required for the WUS to be aligned with the paging (xPDCCH) coverage level. For example, if xPDCCH channels are transmitted such that they are decodable down to a certain Es/Iot level, then the preferred WUS coverage should have at least the same level. Otherwise, the wireless device may fail to decode, e.g., paging because the WUS was not transmitted with a sufficient number of repetitions. In a related embodiment which may be optional, at least one WUSdelta parameter is determined based on the preferred WUS coverage and the default WUS coverage (step 204). In yet a further embodiment which may be optional, the at least one determined WUSdelta parameter is transmitted to the wireless device, e.g., in the system information or in dedicated signaling (step 206).

Note that if there is at least one WUSdelta parameter, it is then the WUSmax determined based on the WUSdelta, rather than the default WUSmax, that is used to limit the number of transmissions of the WUS in step 208. Thus, the assumption is that there is a default WUSmax value is related to Rmax. This may then be modified with the WUSdelta parameter, e.g., corresponding to an increased or decreased Rmax. One example: Assume Rmax=32 implies a WUSmax=3. The UE receives the Rmax and knows that default WUSmax=2. But the UE may also receive a WUSdelta=−1, implying that it should use a lower WUSmax, e.g., the WUSmax corresponding to Rmax=16 (i.e., one step smaller Rmax). That WUSmax may be 2 instead.

Note that in some embodiments, at least one WUSdelta value is signaled, e.g., assuming the WUSdelta would need fewer bits than signaling the WUSmax. Some examples are given herein. As another example, an a priori known scaling factor can be applied to the default WUSmax, in which one bit WUSdelta could imply scaling with e.g., 0.5 or 2 (for the sake of simplicity).

In one embodiment, the WUSmax and WUSdelta are determined by mathematical functions from Rmax. In eMTC, Rmax is determined by the configurable parameter mPDCCH-NumRepetition defined in 3GPP Technical Specification (TS) 36.331 and Rmax>1. For example, WUSmax can be derived from the Rmax configured for paging in a cell from a predefined linear function, possible with an optional adjustment factor, $$WUSmax = Rmax/K + L$$

Here, K is a positive integer which can be either explicitly defined in a specification or signaled to the device as a part of WUSdelta from a set of choices that is explicitly defined in the specification. Similarly, L is an optional adjustment factor that can also be signaled as a part of WUSdelta to the wireless device to adjust the WUSmax value. The values K and L can depend on several factors, e.g. the desired coverage level of the wireless device, wireless device mobility behavior (e.g., speed), transmitted power of the different channels, previous decoding statistics/history, etc. Furthermore, if the result of Rmax/K is not an integer, it can either be rounded up or down to the closet integer, or rounded up to the closet integer that is a power of 2.

In one embodiment, the WUSmax value is determined by a standardized table from one or both of WUSdelta and Rmax, as shown in the example of Table 1, such that the wireless device knows a priori which default WUSmax belongs to which Rmax value. The said mapping table can be predefined, e.g., in a respective 3GPP TS, or it can be derived by using the two parameters according to a certain rule. In an associated embodiment, the WUSdelta parameter could signal deviations from the table, e.g., using the WUSmax value belonging to a higher or lower Rmax value compared to the transmitted Rmax value. In yet a further embodiment, the signaling of Rmax could be optional such that a different WUSmax value is only used if the WUSdelta parameter is actually transmitted. In one embodiment the WUSdelta value would then indicate either an increase or a decrease of WUSmax, but not allow for an unchanged WUSmax.

In yet another embodiment, the WUSmax value is further altered from knowledge that the device is using a specific low performance wake-up radio. Such a receiver could, e.g., have a known or assumed performance loss compared to the usual receiver (which performance is standardized), which would translate to a coverage loss, for which WUSmax needs to be compensated.

Figure 3A:
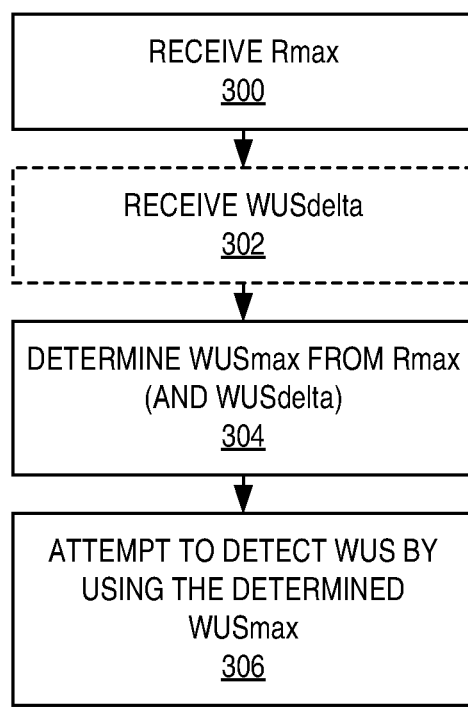
FIG. 3A illustrates a method in a wireless device for determining a WUSmax value that is related to an Rmax value that represents the maximum number of repetitions of a control channel in accordance with some embodiments of the present disclosure.

A second aspect of the present disclosure is a method in a wireless device (e.g., wireless device 112) for determining a WUSmax value that is related to an Rmax value that represents the maximum number of repetitions of the control channel. The method comprises the following steps, see FIG. 3A. Again, optional steps are represented by dashed lines.

First (step 300), the wireless device receives an Rmax value from the network node (e.g., base station 102 or low power node 106), e.g., by receiving system information.

Second, the wireless device determines the WUSmax value from the received Rmax value (step 304). The wireless device may use received WUS related information (e.g., a WUSdelta value received in step 302, values of K, L, the mapping table, mapping rule, etc.) to determine the WUSmax. Finally, the wireless device uses the determined WUSmax value in attempting to detect a WUS, such that the WUS repetitions are limited to the WUSmax value (step 306).

In one embodiment which may be optional (step 302), a WUSdelta is received, and WUSmax is determined either from, e.g., a mathematical function including both WUSdelta and Rmax or from a table lookup based on WUSdelta and Rmax (i.e., determined from a table including both WUSdelta and Rmax).

In one embodiment, the WUSmax value is determined from Rmax and possibly WUSdelta by using a mathematical function. In another embodiment, the WUSmax value is determined by a lookup table, see, e.g., Table 1.

TABLE 1

Example of multidimensional table with Rmax and WUSdelta resulting in WUSmax values

| WUSmax | | Rmax | | | | | | | |
|---|---|---|---|---|---|---|---|---|---|
| | | 1 | 2 | 4 | 8 | 16 | 32 | 64 | 128 | 256 |
| WUSdelta | 1 | 1 | 1 | 1 | 2 | 2 | 3 | 4 | 6 | 8 |
| | 2 | 1 | 1 | 2 | 2 | 3 | 4 | 5 | 8 | 10 |
| | 3 | 1 | 1 | 2 | 3 | 3 | 5 | 6 | 10 | 13 |
| | 4 | 1 | 2 | 2 | 3 | 4 | 6 | 8 | 12 | 16 |

In one embodiment, WUSdelta is optionally transmitted, the absence of which indicated the default WUSmax, and the existence of WUSdelta indicates a deviation from the default WUSmax, e.g., a movement one or more steps in either direction, see Table 2.

TABLE 2

Example of movements one step in either direction by use of WUSdelta increment or decrement signaling

| WUSmax | | Rmax | | | | | | | |
|---|---|---|---|---|---|---|---|---|---|
| | | 1 | 2 | 4 | 8 | 16 | 32 | 64 | 128 | 256 |
| WUSdelta | −1 | 1 | 1 | 1 | 2 | 3 | 4 | 6 | 8 | 10 |
| | [0] | 1 | 1 | 2 | 3 | 4 | 6 | 8 | 10 | 12 |
| | 1 | 1 | 1 | 3 | 4 | 6 | 8 | 10 | 12 | 16 |

In addition to the embodiments described above, in some embodiments, the WUSdelta is used for implicit signaling of synchronization functionality. An unsynchronized wireless device (e.g., a UE) requires a longer sequence for the same detection performance, compared to a synchronized wireless device (e.g., a UE). In this case, the base station (e.g., an eNB) would signal a WUSdelta value corresponding to a shorter WUSmax if the base station wants the wireless device to use another means of synchronization, and a WUSdelta value corresponding to a longer WUSmax if the base station wants the wireless device to be able to use the WUS for synchronization. Thus, in some embodiments, in step 206 of FIG. 2, the base station signals a WUSdelta value corresponding to a shorter WUSmax if the base station wants the wireless device to use another means of synchronization, and a WUSdelta value corresponding to a longer WUSmax if the base station wants the wireless device to be able to use the WUS for synchronization.

Figure 3B:
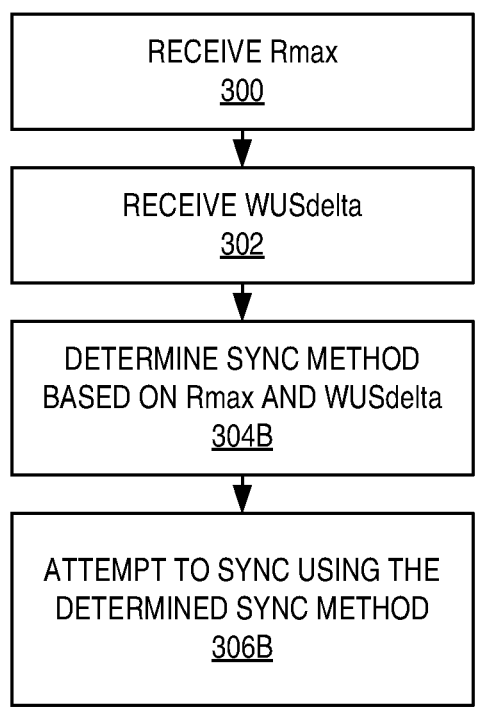
FIG. 3B illustrates a method in a wireless device in which the WUSdelta parameter is used to implicitly signal a preferred synchronization method/functionality in accordance with some embodiments of the present disclosure.

As for the wireless device (e.g., UE), in some embodiments, the wireless device determines a preferred synchronization method based on a WUSdelta value. Typically, wireless devices (e.g., UEs) synchronize towards the network with Primary Synchronization Signal (PSS) and Secondary Synchronization Signal (SSS), after which the wireless device has gained time and frequency synchronization and determined the cell Identifier (ID). However, if instead the WUS is used for synchronization, the wireless device will be able to instead use the WUS for synchronization when waking up from sleep mode in order to read a WUS. However, in some embodiments, the network may choose to vary the length of the WUS such that it may or may not be used for synchronization. Thus, in some embodiments, the WUS delta parameter can be used to implicitly signal the preferred synchronization method/functionality, as described above. As illustrated in FIG. 3B, on the wireless device side, the wireless device receives the Rmax and WUSdelta information, as described above (steps 300 and 302). The wireless device determines the synchronization method to be used by the wireless device based on the Rmax and WUSdelta information (step 304B). More specifically, in one embodiment, the wireless device determines whether the resulting WUSmax (i.e., the WUSmax resulting from a default WUSmax derived from the Rmax, and the WUSdelta) is sufficiently long to be used for synchronization. If so, the wireless device determines that WUS is to be used for synchronization. Otherwise, the wireless device determines that another means of synchronization is to be used, e.g., legacy PSS/SSS for eMTC or NB-IoT PSS (NPSS)/NB-IoT SSS (NSSS) for NB-IoT. The wireless device uses the determined synchronization method for attempting to synchronize towards the network (step 306B).

In step 304B, in some embodiments, the wireless device determines the synchronization method to use by comparing the WUSmax (resulting from Rmax and WUSdelta) to a threshold. In one embodiment, the threshold that is used for determining the synchronization method is variable with respect to the Discontinuous Reception (DRX) or extended DRX (eDRX) cycle, such that a shorter (e)DRX cycle will result in a lower threshold, and vice versa. If the WUSmax is greater than the threshold, then the WUS can be used for synchronization. Otherwise, another synchronization method is used.

The following text describes some example implementations of at least some aspects of the embodiments described above as they relate to a specific type of 3GPP network.

In RAN1 #91, the following agreements on downlink channel power efficiency for MTC were reached [1]:
Agreements:
At least in a UE's DRX cycle, one WUS informs UE whether to monitor the PO in a single DRX cycle
Working assumption: At least in a UE's DRX cycle, how the UE knows the WUS time location, is:
  A WUS has a time location which is configurable with respect to the associated PO(s) location(s)
There is at least one WUS parameter determined by at least SI for at least IDLE_MODE UE.
The [maximum] WUS length in a cell is configurable
Further study the benefits of potential diversity methods in WUS design
Further study the benefits of potential inter-cell interference randomization methods in WUS design A UE power saving design for MTC is proposed below for dealing with many of the significant outstanding questions. The discussion below also presents the power performance improvements resulting from the design.

In regard to 3GPP Release 15, it is proposed that WUS or DTX with a new synchronization signal is chosen as power saving procedure. Furthermore, based on presented simulation results, it is apparent that RRC_IDLE mode is prioritized before RRC_CONNECTED mode. Combined with little remaining time, the remaining meetings should focus on RRC_IDLE mode. Thus, it is also proposed that WUS is specified for IDLE mode.

Network Paging Procedure: Generally, it is desired to minimize the impact to the standard and maintain the layer 3 paging procedure. That is, MME transmits paging request to the eNB, paging is transparent to the eNB in the sense it does not keep track of the paging once sent, and whether WUS is transmitted to a UE is controlled by eNB, see FIG. 4, which is a signaling diagram for WUS configuration and procedure.

Figure 4:
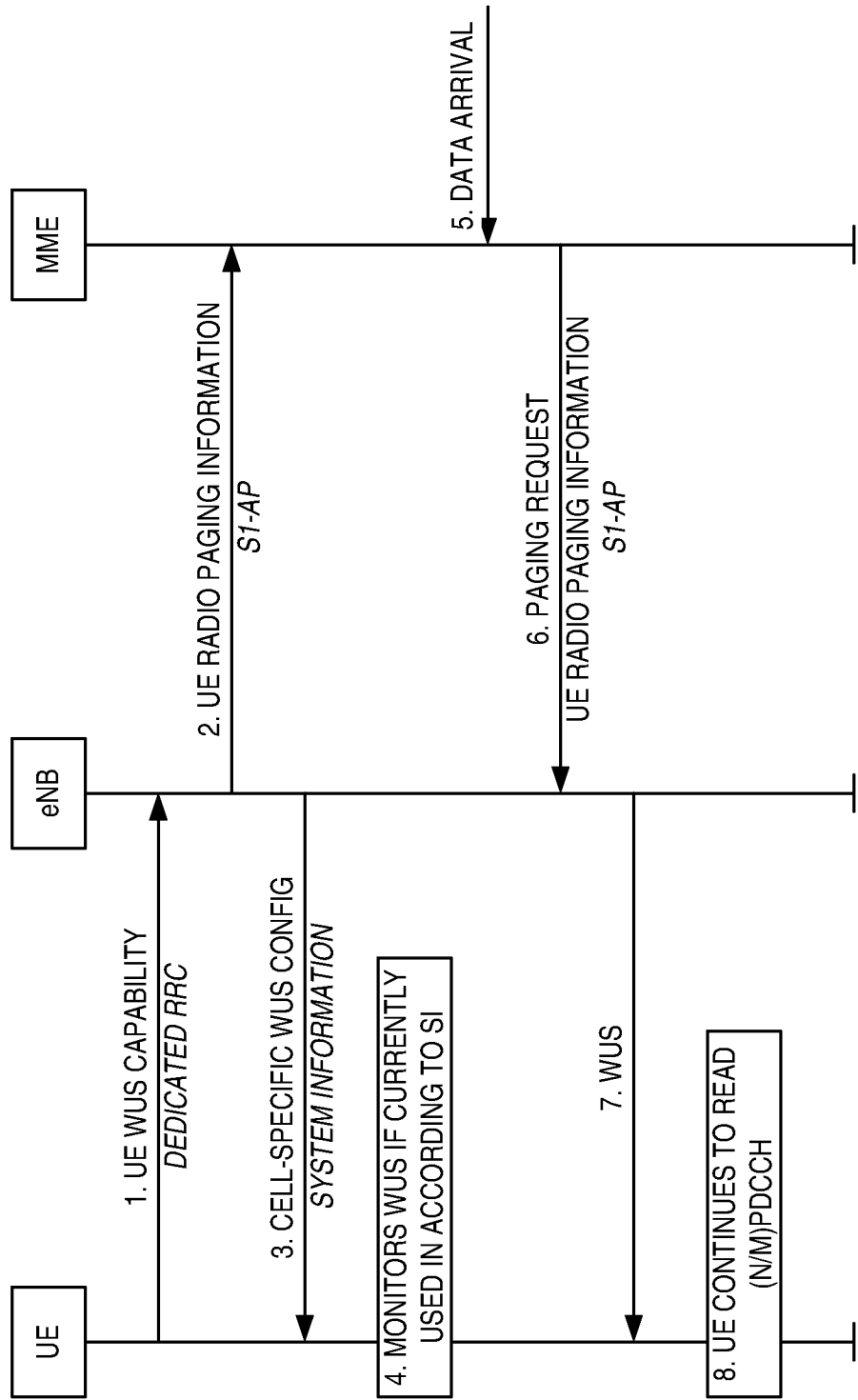
FIG. 4 is an example of a WUS configuration procedure in accordance with some embodiments of the present disclosure.

As illustrated in FIG. 4, the UE sends UE WUS capability information to the eNB (step 1). The UE WUS capability information indicates the UE's capability to monitor for the WUS. The eNB provides UE radio paging information to the MME (step 2). The eNB also sends cell-specific WUS configuration information to the UE (step 3). The UE monitors for a WUS in accordance with the received cell-specific WUS configuration (step 4). Upon the arrival of data at the MME (step 5), the MME sends a paging request to the eNB (step 5). The eNB transmits a WUS (step 7). Upon detecting the WUS, the UE continues to read the xPDCCH (step 8).

It is understood that the higher layer paging process, with WUS implemented as a RAN feature. A more detailed description related to WUS is found in [5].

It is observed that the wake-up signal should be designed such that interoperability testing is kept to a minimum, to avoid delaying and restricting the introduction of this feature.

WUS Monitoring Duration: A reasonable paging approach is that, in the first attempt the eNB makes to reach the UE, the WUS is sent with a WUS corresponding to the UE's coverage level. In case two or more UEs are being addressed, the WUS is dimensioned after the UE with the worst coverage level. If the UE does not respond to the first paging message, the subsequent WUS may be transmitted to provide increased coverage all the way up to the maximum number or WUS repetitions supported by the cell, WUSmax.

A starting point when defining the number of WUS repetitions is to consider how repetitions of paging messages are defined. For paging, the UE is required to receive paging, implying that the UE must monitor paging up to Rmax. From a power perspective, this is clearly a potentially very expensive requirement, particularly for UEs in good coverage, in case no paging message is present. Instead, if the UE prior to attempting to detect the WUS has estimated its coverage, it may be possible to determine a likely number of repetitions to accumulate for a high probability WUS detection, without the UE being required to accumulate all the way up to Rmax. The number of repetitions may be determined by RAN4 in 3GPP TS 36.133.

It is observed that the number of repetitions the UE is required to monitor for a given coverage level will be determined by RAN4.

UE Idle Mode Paging Cycle Operations: Waking up from a long duration of sleep, the UE is required to perform multiple tasks. So far, the discussions have focused on the WUS, but to make a suitable design, one must follow all RAN2 procedures and fulfil the RAN4 requirements, i.e., the complete paging cycle needs to be considered. For idle mode, the UE is required to perform the following operations:
1. Network resynchronization
   a. Time-frequency synchronization and cell id confirmation
2. Serving cell and occasionally also neighboring cell measurements
3. Decode paging
   a. Detect WUS, and, if found,
   b. Decode MPDCCH Naturally, depending on the UE implementation, some of the above tasks could be performed in altering order, or even simultaneously, but they still need to be performed. It is also worth noting that, at least for the eDRX case, the UE needs to accumulate several measurement samples for cell detection, measurement, and evaluation with some duration in-between measurements to obtain a more accurate measurement result [6]. Considering the working assumption from RAN1 #90 bis about the idle mode power saving signal being WUS or DTX', the above operations are only possible if the UE is synchronized prior to attempting to detect the WUS, unless the UE should perform another sync attempt when no WUS is detected.

It is observed that network synchronization should be performed independently of the wake-up signal to benefit idle mode operations also when no wake-up signal is transmitted.

Here it is also worth noting that the WI objective 'Relaxed monitoring for cell reselection' in RAN2/4 only changes the measurement rules for cell re-selection as defined in [7], i.e. it changes when the UE is triggered to perform neighbor cell measurements. When the UE is triggered to perform such neighbor cell measurements, then the UE performs those measurements as defined in [6]. Hence, it does not change the requirements for idle mode procedures and measurement requirements for the cell that the UE is camping on.

It is observed that the WI objective 'Relaxed monitoring for cell reselection' does not imply a relaxed need for camping cell measurements, and thus network synchronization.

Here it is worth noting that the UE needs to reconfirm its cell ID and perform measurements ahead of detecting the WUS. Performing those tasks in a different order will result in a UE cannot perform the required idle mode mobility procedures or not detecting the WUS at all, since WUS is assumed to be cell specific as agreed in RAN1.

When the LTE-MTC UE is in eDRX or for longer DRX configurations, before monitoring the paging time window (PTW), it needs to confirm whether it remains in the same cell. If not, the UE needs to reacquire the system information if it has not stored System Information (SI) information of the new cell and find the Paging Occasion (PO) in the new cell. Notice that the cell identity is carried by the SSS (or possibly RSS). To receive the SSS correctly, the UE needs to synchronize to the network first. Therefore, even if the WUS can provide synchronization function and even cell id information, it cannot help the UE to identify the cell when no WUS is transmitted. It may also be worth noting that the WUS is most likely to be cell specific, and the configurations of WUS may differ among neighboring cells. Hence, when the UE is in eDRX, it needs to wake up early enough to confirm which cell it is in. This ensures the UE would not miss the WUS when it comes to a new cell. Combined with the WUS being a randomly transmitted signal from the UE perspective, it cannot be used for detecting cell changes.

It is observed that in many DRX and eDRX configurations, since the UE needs to confirm whether it remains in the same cell as before, by checking the SSS (or RSS), the UE is already synchronized to the network prior to the PTW.

It is observed that a UE cannot rely on a randomly transmitted signal like the WUS or DTX' for network synchronization.

Figure 5:
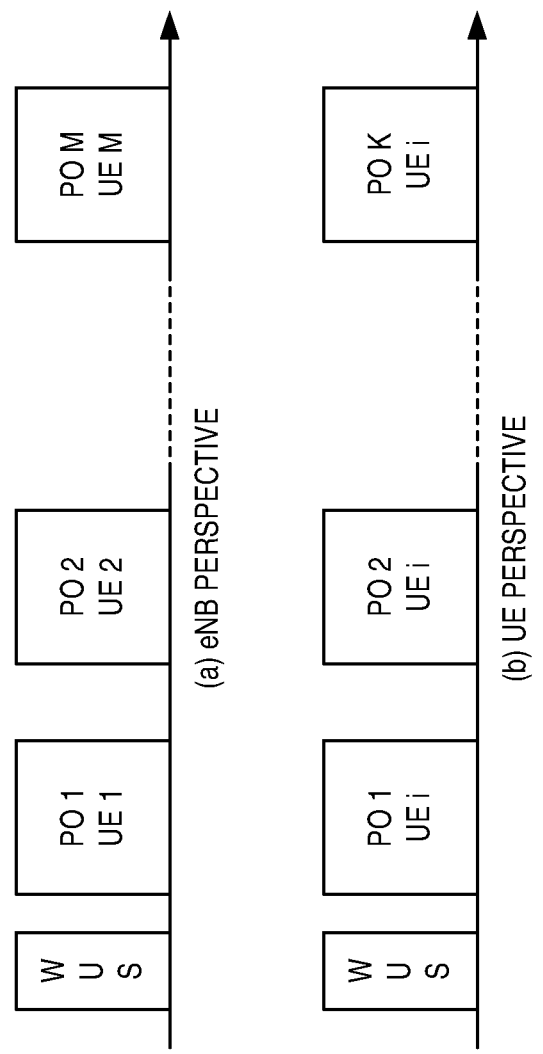
FIG. 5 illustrates the base station and wireless device perspectives with respect to the relation between the number of WUS and paging occasions in accordance with some embodiments of the present disclosure.

WUS-to-PO Relations: One topic that has been discussed over length at previous 3GPP meetings is the relation between WUS and PO. This topic can be approached from two perspectives—that of the eNB and that of the UE. FIG. 5 illustrates the difference between the two. Specifically, FIG. 5 illustrates the eNB and UE perspectives with respect to the relation between the number of WUS and POs. They are described in more detail in the following subsections.

eNB Perspective: There is little if any benefit with anything else than a 1-to-many mapping from the eNB perspective. Considering the paging rate, typically only one UE will be paged at the time and hence, only one PO will be utilized at a time. For that reason, network overhead is unaffected by aggregating POs from multiple UEs into the same WUS. However, there are clear disadvantages with a 1-to-many mapping, predominantly from an increased UE power consumption due to the increased false paging rate, but also from network fragmentation most likely negating any network overhead gain to be had. Also, a 1-to-many mapping would complicate the WUS positioning in relation to the PO.

Thus, it is observed that there is little if any benefit from a 1-to-many mapping of WUS and POs from the eNB perspective.

It is proposed that, from the eNB perspective, there is a 1-to-1 mapping between WUS and PO.

UE Perspective in DRX: From the UE perspective, i.e., the number of POs that the UE needs to monitor upon detection of a WUS, the simple and from a system perspective robust case is to use a 1-to-1 mapping. That will allow the least problems in the implementation of WUS and reduce interoperability issues between MME and eNB in case these have different vendors. There could however be situations where a larger power savings may be attractive despite the larger latency resulting from it. In eMTC, where the DRX cycle is the same as that of the underlying LTE network, it may be beneficial to allow a longer paging cycle at the expense of a higher latency. For such a case, it is however important that MME-eNB interface can handle it, and that UE mobility functionality is maintained. Also, for these cases the same effect can be achieved by increasing the PO cycle. Hence, there is little use with additional WUS to PO ratios from a power saving perspective.

It is proposed that, from the UE perspective, in DRX, there is a 1-to-1 between WUS and PO.

UE Perspective in eDRX: For the same reasons as for the DRX case, the default WUS configuration in eDRX should be simple and robust to ensure success and wide use of WUS. That implies a 1-to-1 mapping also here.

It is proposed that, from the UE perspective, in eDRX, the default network configuration is a 1-to-1 mapping between WUS and PO.

One problem that may be encountered when developing the wake-up signal is to understand the design impact from the simulation assumptions. One such parameter is the number of POs (#POs) per PTW that is fixed at 4 for both the assessed eDRX scenarios. Here, one solution that would provide substantial UE power gains is to decrease the number WUS so that only one WUS per PTW is selected. However, the same gains would arise from decreasing the number of POs in the PTW, and the question to consider is why the multiple POs were defined in the first place. There are three main reasons for this:
1. UE mobility
2. Network robustness
3. Scheduling flexibility To not compromise these, the number of POs should remain and the WUS design should not significantly compromise any of the above reasons. That excludes, e.g., mapping a single WUS to the whole PTW, since mobility is compromised without the ability of using WUS for paging escalation. However, adding only a second WUS in the PTW would allow for network escalation. Similarly, most of the scheduling flexibility benefits can be assumed to arise from allowing the eNB to choose between at least two POs when allocating the MPDCCH. From the network robustness side, e.g., between the MME-eNB interface, it is important that the duration between the WUS and the following MPDCCH is not too long, e.g., within 5 seconds (s). Furthermore, in eDRX, latency requirements are binary in that the paging message should be delivered within the PTW but disregarding at which POs within the PTW the page is received. Overall, the above implies that also for eDRX there is room for an optional WUS configuration. However, such an optional configuration must not compromise the ability of the network to reach a UE within the PTW.

It is proposed that the WUS design for eDRX must allow the network to reach a UE within a PTW.

It is proposed that, from the UE perspective, in eDRX, an optional network configuration is a 1-to-N mapping between WUS and PO.

WUS Location and Maximum Durations: In RAN1 #91, the WUS time location was agreed as a working assumption. This working assumption should be confirmed into an agreement.

It is proposed that, at least in a UE's DRX cycle, how the UE knows the WUS time location, is:
  A WUS has a time location which is configurable with respect to the associated PO(s) location(s)

Furthermore, there is little use with a different definition for eDRX, since when the UE wakes up, it is, per definition, in DRX. Also, the PTW is defined in relation to the first PO in the PTW why the same definition should be used for both DRX and eDRX. Hence, the same WUS time locations can be used for both DRX and eDRX.

It is proposed that the same WUS time offset compared to the PO is used for eDRX and DRX.

Figure 6:
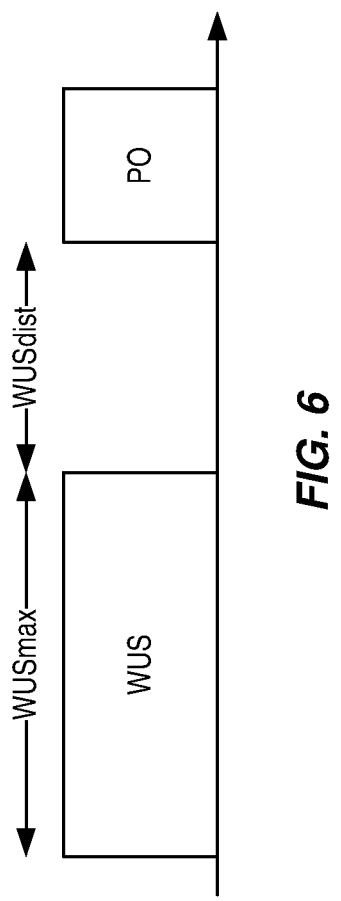
FIG. 6 illustrates that the WUS location is a function of two parameters, namely, WUS duration and WUS distance from the associated paging occasion.

For power saving reasons, the WUS should be defined as the start of the WUS, since that would allow UEs in good coverage to spend less time in light sleep while otherwise needing to wait longer for its possibly much shorter WUS to appear. For eMTC, where network fragmentation is less of a problem due to the larger BW compared to, e.g., NB-IoT, this is judged to be the primary design parameter. Consequently, the WUS location is determined by two parameters as illustrated in FIG. 6:
  WUS duration
  WUS distance from the associated PO FIG. 6 illustrates WUS location relative the associated PO.

It is proposed that the WUS location is defined as a maximum WUS duration of a cell, WUSmax, and a WUS distance from the associated PO(s), WUSdist.

It is proposed that the sum of WUSmax and WUSdist indicates the WUS start location prior to the associated PO(s).

Considering the values of WUSmax, it is desirable that they should correspond to the coverage provided by Rmax in an MPDCCH paging message. Equating WUSmax with Rmax is clearly suboptimal since WUS will have much better coverage per repetition than MPDCCH due to its lower information content. That does not imply, though, that there is no relation between Rmax and WUSmax. As a starting point, the MPDCCH coverage as obtained by Rmax can be used to define WUSmax. However, WUS may be received both with the normal receiver or a dedicated and wake-up receiver with likely worse reception performance, why a rigid 1-to-1 mapping between WUSmax and Rmax is undesirable. Hence, some scaling between WUSmax and Rmax should be allowed. If WUSmax is derived from Rmax, only the differentiation needs to be signaled with a lower bit WUSdelta, thereby reducing the necessary information content to be distributed. Mathematically this may be expressed as WUSmax being a function of Rmax and WUSdelta, $$WUS_{max}=f(R_{max},WUS_{delta})$$

The function f( ) could be implemented as a lookup table matching WUS coverage using WUSmax with MPDCCH coverage using Rmax. WUSdelta could be an optional parameter in the case it is desirable to increase or decrease WUS coverage with WUSmax relative MPDCCH coverage with Rmax. For example, a 1-bit WUSdelta could allow WUSmax to be determined from a higher or lower Rmax instead.

It is proposed that WUSmax is determined from Rmax and an additional, optional parameter, WUSdelta, may further modify WUSmax.

WUS Sequence Design: To reduce WUS implementation complexity and provide inter-cell differentiation, an m-sequence is used as WUS. The existing use of m-sequences in the SSS avoid being confused with the WUS by utilizing the full 6 Physical Resource Block (PRB) Bandwidth (BW) and possibly also by using different polynomials. Taking advantage of the full 6 PRB, 72 Subcarrier (SC) BW is possible since the UE is already synchronized from the RSS or PSS, thereby eliminating the need for a guard band. The benefit with m-sequences compared to Zadoff-Chu (ZC) sequences is that they allow more sequences for the same sequence length, thereby allowing for more complete cell information to be provided by the sequence. Additionally, m-sequences have good inter-cell interference properties, well known from the SSS. Regarding detection performance, m-sequences are on par with ZC-sequences without the frequency ambiguity problem that is associated with ZC-sequences.

Figure 7:
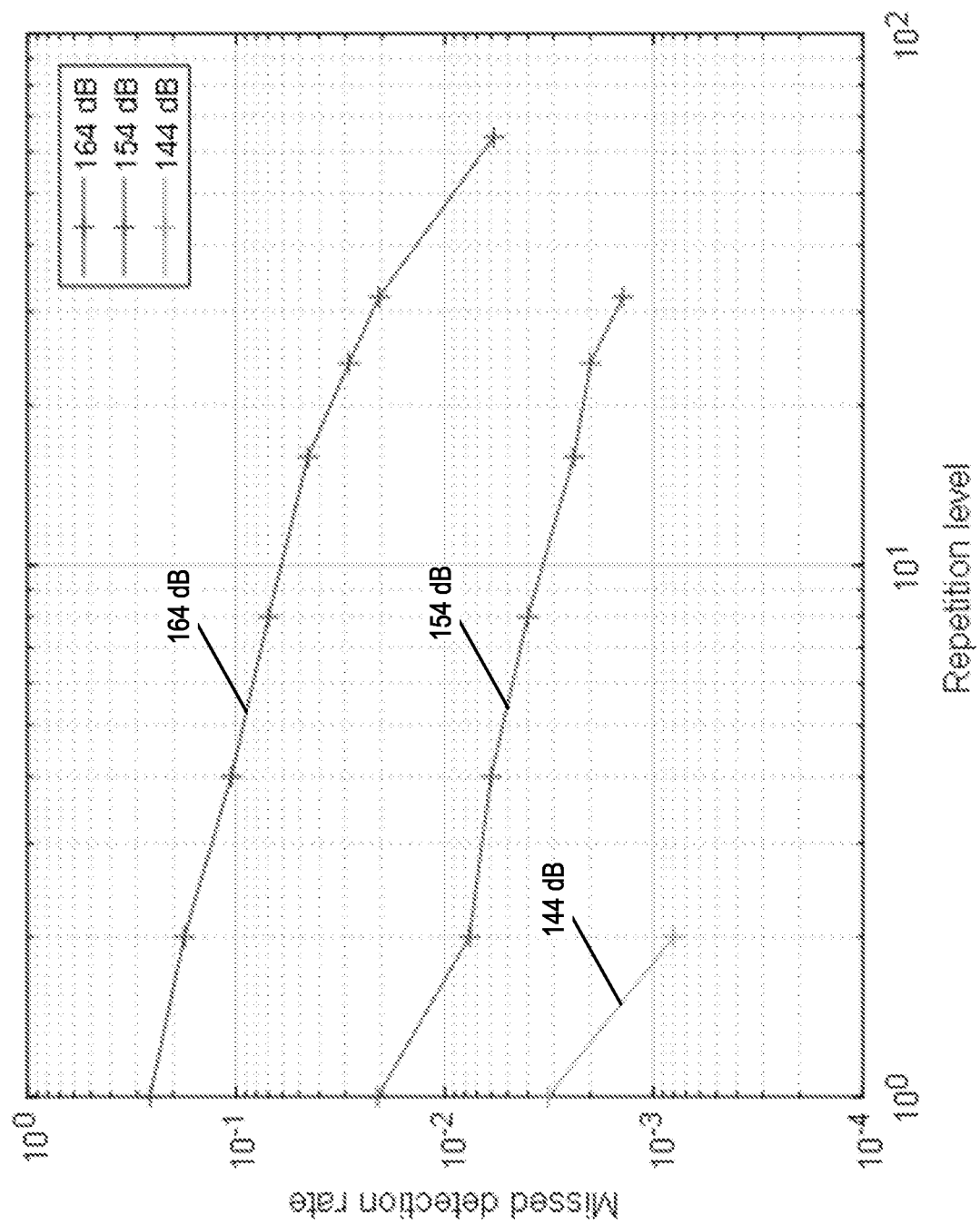
FIG. 7 illustrates example simulation results that show WUS missed detection performance for different WUS lengths at 5% false detection rate for ETU1 and without any power boosting or transmit diversity.

The performance for different numbers of m-sequence repetitions is presented in FIG. 7, for the SNR levels −22.5 decibels (dB), −12.5 dB and −2.5 dB, corresponding to MCLs 164 dB, 154 dB and 144 dB, respectively. FIG. 7 illustrates WUS missed detection performance for different WUS lengths at 5% false detection rate for ETU1 and without any power boosting or Transmit (TX) diversity. The simulations are done for an ETU1 channel without either power boosting or TX diversity, implying further gains are possible. The results are based on a 72 SC wide m-sequence over 11 symbols per Subframe (SF) using a detection threshold corresponding to a 5% false detection rate. Received data has been coherently combined over a full subframe and noncoherently combined between subframes. This is well within the margin, considering the 30 Hertz (Hz) frequency error and the ETU1 channel. From FIG. 7, it is evident that 1 subframe is sufficient to detect a WUS at 144 dB MCL with a missed detection rate far below 1%. Furthermore, 4 subframes would suffice for 154 dB and 32 subframes combined with TX diversity or 3 dB power boost would suffice to achieve below 1% missed detection rate for the 164 dB MCL case. Moreover, 1 and 4 subframes would allow for a 70% and 90% detection rate, respectively, at 164 dB MCL.

It is proposed that M-sequences are used as wake-up signal sequence.

WUS detection defined as the correlated signal exceeding a threshold within the Cyclic Prefix (CP). ETU 1 channel and a false detection rate of 5%. Furthermore, the simulation assumptions stipulate a 30 Hz frequency error for eMTC, allowing for coherent detection for up to approximately 10 SFs for the stationary, no Doppler case. This may be particularly useful for the deeper coverage scenarios where stationarity is a reasonable assumption.

TABLE 3

$99^{th}$ percentile transmission durations for a 6 PRB wide WUS, ETU 1 and no power boosting.

| WUS size (# SFs) $99^{th}$ percentile | MCL [dB] | | |
|---|---|---|---|
| | 144 | 154 | 164 |
| ½ SF coherent detection | <1 | 4 | N/A |
| 1 SF coherent detection | <1 | 2 | 48 |

Here it is also worth noting that transmission diversity is likely to improve the above performance even further, particularly for 164 dB MCL.

UE Grouping: UE grouping may be a way to reduce the false alarm rate for UEs belonging to the same PO. As such, most of the gains to be had are found going from one group to two. On the other hand, introducing many UE groups risk reducing detection performance and waste network resources, both of which are clearly undesirable. A reasonable compromise is to introduce UE grouping with orthogonal cover codes, such that they share the same resources, but different codes are used for different UEs. A consequence of this is that the UE would need to belong in at least two groups, since a supergroup, comprising all UEs in the PO would be needed for, e.g., direct indication. Assuming a WUS covering at least 11 symbols in a subframe, and the PO utilizing at least one subframe, that gives 3+ bits of information that could be used, e.g., for UE grouping, allowing for up to 7 UE groups and 1 super group.

It is observed that UE grouping using cover codes will limit network resource cost.

It should also be noted that although a slight increase in the false detection rate can be expected, that is outweighed by the fewer false detections from the smaller UE set, the missed detection rate remains unchanged. The reason for that is that the UE typically never attempts to determine the most likely transmitted code in the code set, but only whether the UE's allocated code was transmitted.

It is observed that UE grouping with 3 subgroups and one supergroup, implemented by cover codes, could allow for UE grouping at a negligible detection performance loss and network overhead increase.

The discussion now turns to a discussion of some example embodiments of a radio access node and a wireless device followed by a discussion of embodiments related to a communication system.

Figure 8:
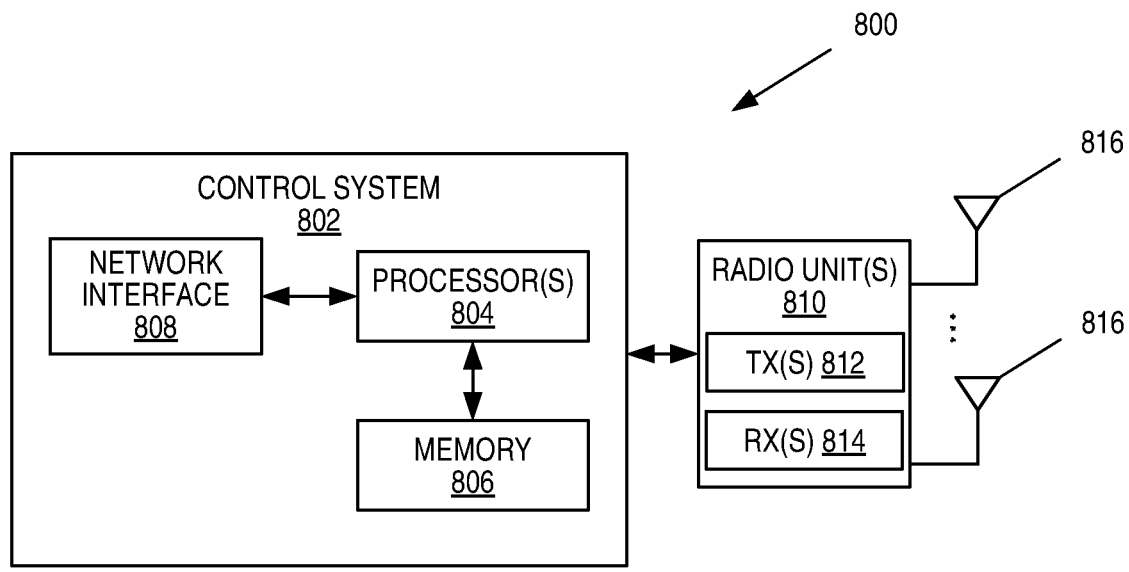
FIGS. 8 through 10 illustrate example embodiments of a radio access node.

FIG. 8 is a schematic block diagram of a radio access node 800 according to some embodiments of the present disclosure. The radio access node 800 may be, for example, a base station 102 or 106. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. In addition, the radio access node 800 includes one or more radio units 810 that each includes one or more transmitters 812 and one or more receivers 814 coupled to one or more antennas 816. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
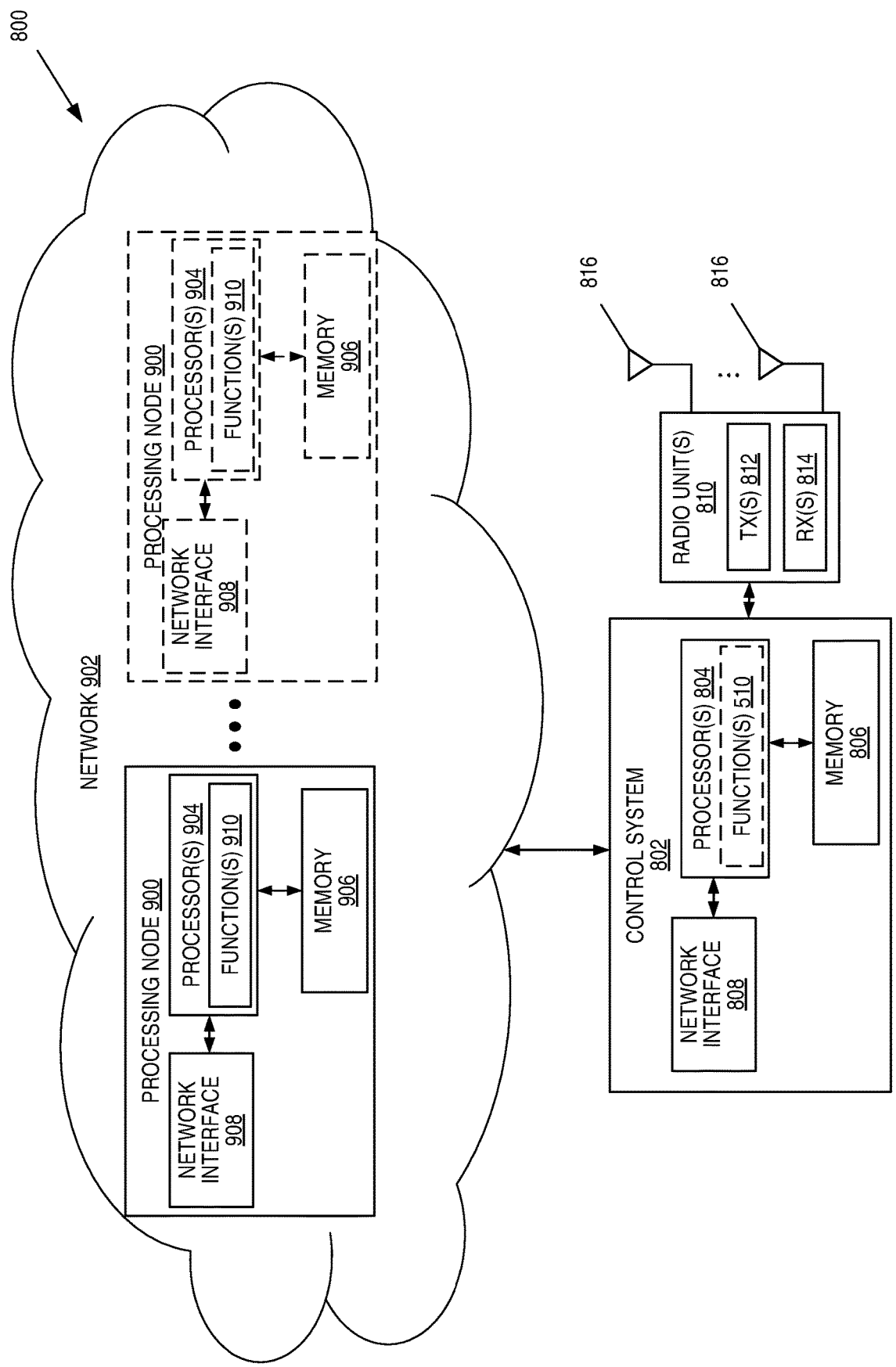

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
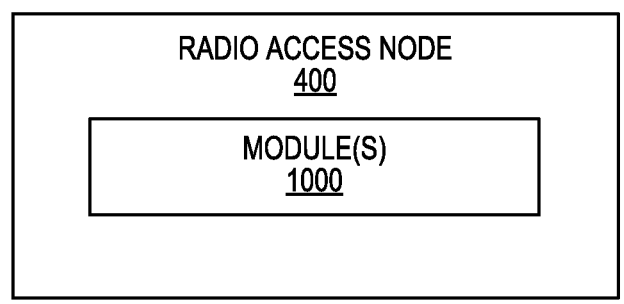

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
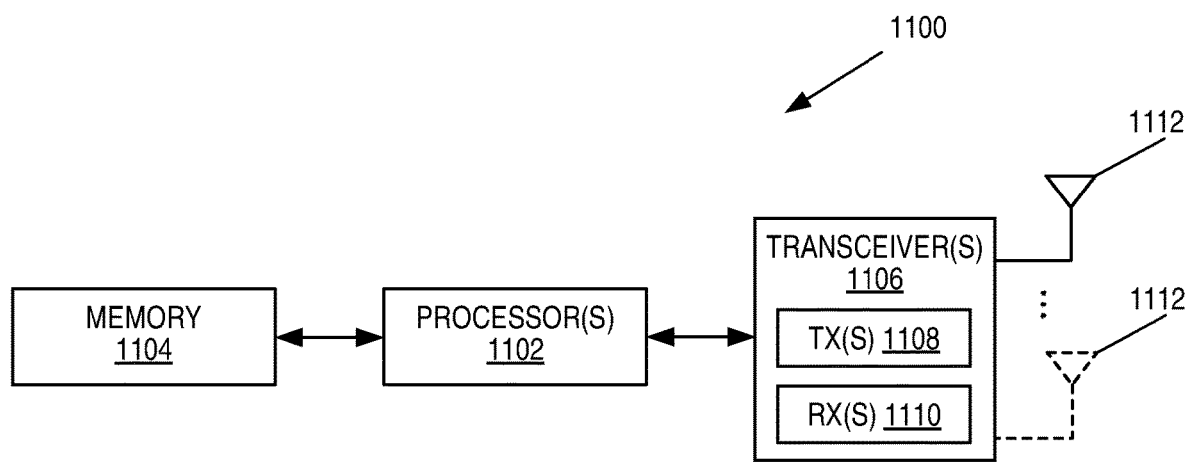
FIGS. 11 and 12 illustrate example embodiments of a wireless device.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. In some embodiments, the functionality of the UE 1100 described above may be fully or partially implemented in software that is, e.g., stored in the memory 1104 and executed by the processor(s) 1102.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
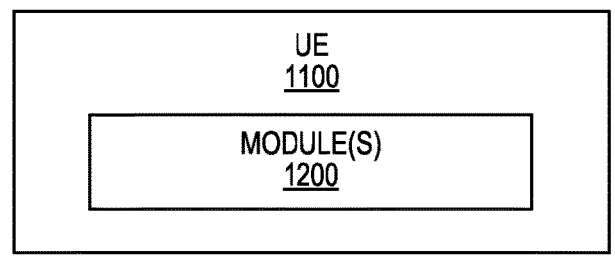

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Figure 13:
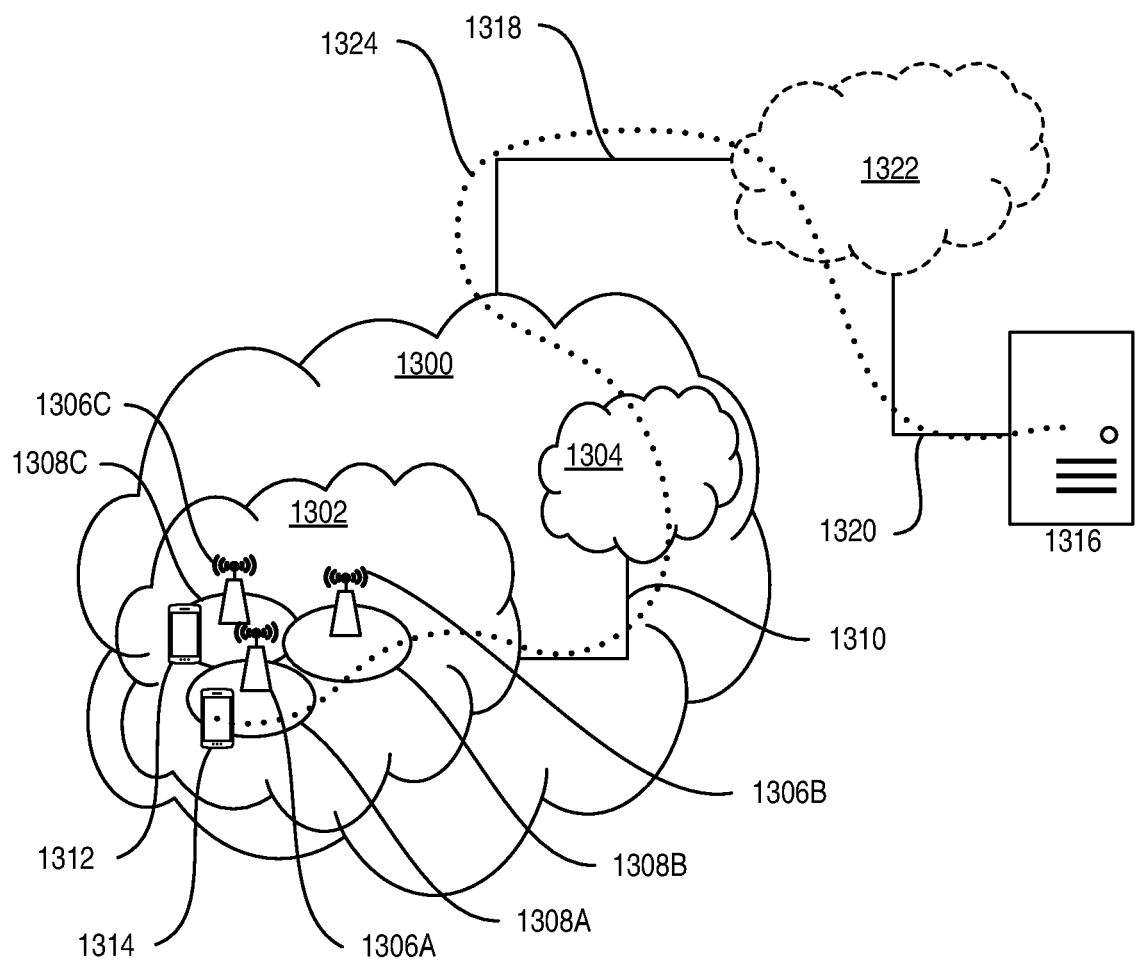
FIG. 13 illustrates an example communication system in which embodiments of the present disclosure may be implemented.

With reference to FIG. 13, in accordance with an embodiment, a communication system includes a telecommunication network 1300, such as a 3GPP-type cellular network, which comprises an access network 1302, such as a Radio Access Network (RAN), and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 13066, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
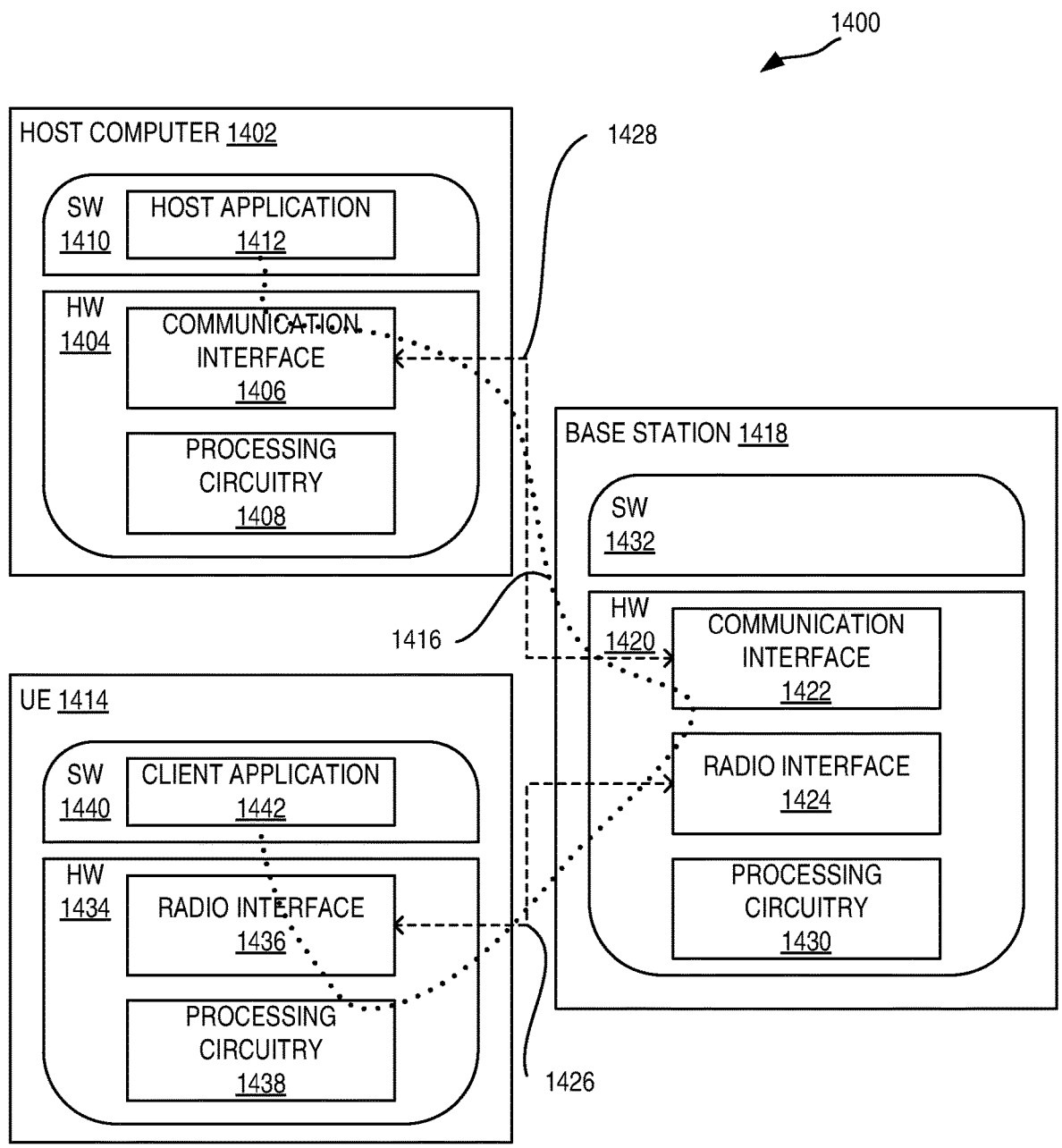
FIG. 14 illustrates example implementations of a User Equipment (UE), a base station, and a host computer in accordance with some embodiments of the present disclosure.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve, e.g., power consumption, and thereby provide benefits such as, e.g., extended battery lifetime.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1414, and it may be unknown or imperceptible to the base station 1414. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702 (which may be optional), the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804, the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are as follows:

Group A Embodiments

Embodiment 1: A method in a wireless device for determining a wake-up signal maximum repetition value, WUSmax value, representing a maximum number of repetitions of a wake-up signal, the WUSmax value being related to a maximum repetition value, Rmax value, representing a maximum number of repetitions of signals transmitted by a network node in a cellular communications network, the method comprising: receiving (300) a Rmax value from the network node; determining (304) a WUSmax value based on the Rmax value; and attempting (306) to detect a wake-up signal from the network node using the determined WUSmax value.

Embodiment 2: The method of embodiment 1 wherein the wake-up signal is a signal transmitted by the network node to indicate to the wireless device that the wireless device is to continue to decode a respective channel.

Embodiment 3: The method of embodiment 2 wherein the respective channel is a physical downlink control channel, and the Rmax value defines a maximum number of repetitions used by the network node when transmitting the physical downlink control channel.

Embodiment 4: The method of embodiment 3 wherein the wireless device is an Enhanced Machine Type Communication (eMTC) device, and the physical downlink control channel is a MTC Physical Downlink Control Channel (MPDCCH).

Embodiment 5: The method of embodiment 3 wherein the wireless device is a Narrowband Internet of Things (NB-IoT) device, and the physical downlink control channel is a Narrowband Physical Downlink Control Channel (NPDCCH).

Embodiment 6: The method of any one of embodiments 1 to 5 wherein determining (304) the WUSmax value based on the Rmax value comprises determining (304) the WUSmax value from the Rmax value by a mathematical function.

Embodiment 7: The method of embodiment 6 wherein the mathematical function is predefined.

Embodiment 8: The method of any one of embodiments 1 to 5 wherein determining (304) the WUSmax value based on the Rmax value comprises determining (304) the WUSmax value from the Rmax value by a table lookup.

Embodiment 9: The method of embodiment 8 wherein the table lookup uses a predefined table.

Embodiment 10: The method of any one of embodiments 1 to 9 further comprising receiving (302) a wake-up signal delta value, WUSdelta value, from the network node.

Embodiment 11: The method of embodiment 10 wherein determining (304) the WUSmax value based on the Rmax value comprises determining (304) the WUSmax value based on the Rmax value and the WUSdelta value.

Embodiment 12: The method of embodiment 10 wherein determining (304) the WUSmax value based on the Rmax value comprises determining (304) the WUSmax value from the Rmax value and the WUSdelta value by a mathematical function.

Embodiment 13: The method of embodiment 12 wherein the mathematical function is predefined.

Embodiment 14: The method of embodiment 10 wherein determining (304) the WUSmax value based on the Rmax value comprises determining (304) the WUSmax value from the Rmax value and the WUSdelta value by a table lookup.

Embodiment 15: The method of embodiment 14 wherein the table lookup uses a predefined table.

Embodiment 16: The method of embodiment 10 wherein determining (304) the WUSmax value based on the Rmax value comprises determining (304) the WUSmax value from the Rmax value and the WUSdelta value such that the WUSmax value is changed from a previous WUSmax value if the WUSdelta value is actually received.

Embodiment 17: The method of any of the previous embodiments, further comprising: providing user data; and forwarding the user data to a host computer via the transmission to the base station.

Embodiment 18: A method in a wireless device for determining a synchronization method to be used by the wireless device in a cellular communications network, comprising: receiving (300) a maximum repetition value, Rmax value, from a network node, the Rmax value representing a maximum number of repetitions of signals transmitted by the network node in the cellular communications network; receiving (302) a wake-up signal delta value, WUSdelta value, from the network node, wherein a wake-up signal maximum repetition value, WUSmax value, for a wake-up signal is based on the Rmax value and the WUSdelta value; determining (304B) a synchronization method to be used by the wireless device based on the Rmax value and the WUSdelta value; and attempting to synchronize (306B) to the cellular communications network using the determined synchronization method.

Embodiment 19: The method of embodiment 18 wherein the wake-up signal is a signal transmitted by the network node to indicate to the wireless device that the wireless device is to continue to decode a respective channel.

Embodiment 20: The method of embodiment 19 wherein the respective channel is a physical downlink control channel, and the Rmax value defines a maximum number of repetitions used by the network node when transmitting the physical downlink control channel.

Embodiment 21: The method of embodiment 20 wherein the wireless device is an Enhanced Machine Type Communication, eMTC, device, and the physical downlink control channel is a MTC Physical Downlink Control Channel, MPDCCH.

Embodiment 22: The method of embodiment 20 wherein the wireless device is a Narrowband Internet of Things, NB-IoT, device, and the physical downlink control channel is a Narrowband Physical Downlink Control Channel, NPDCCH.

Embodiment 23: The method of any one of embodiments 18 to 22 wherein determining (304B) the synchronization method to be used by the wireless device based on the Rmax value and the WUSdelta value comprises: determining the WUSmax value based on the Rmax value and the WUSdelta value, the WUSmax value representing a maximum number of repetitions of a wake-up signal; and determining the synchronization method to be used by the wireless device based on a comparison of the WUSmax value to a threshold.

Embodiment 24: The method of embodiment 23 wherein determining the synchronization method to be used by the wireless device based on a comparison of the WUSmax value to a threshold comprises: comparing the WUSmax value to the threshold; if the WUSmax value is greater than the threshold, determining that a wakeup signal can be used for synchronization; and otherwise, determining that another synchronization method is to be used.

Embodiment 25: The method of embodiment 24 wherein the other synchronization method is a legacy (i.e., wake-up signal independent) synchronization method.

Embodiment 26: The method of any one of embodiments 23 to 25 wherein the threshold is a function of a Discontinuous Reception, DRX, or extended DRX, eDRX, cycle.

Embodiment 27: The method of any one of embodiments 23 to 25 wherein the threshold is a function of a Discontinuous Reception, DRX, or extended DRX, eDRX, cycle such that a shorter DRX or eDRX cycle results in a lower threshold and a longer DRX or eDRX cycle results in a higher threshold.

Embodiment 28: The method of any one of embodiments 18 to 27, further comprising: providing user data; and forwarding the user data to a host computer via the transmission to the base station.

Group B Embodiments

Embodiment 29: A method in a network node for efficiently transmitting information of a wake-up signal maximum length, related to a maximum repetition factor used for other signals, the method comprising: determining (200) a default wake-up signal repetition value, WUSmax value, related to a maximum repetition value, Rmax value, used for other signals; and transmitting (208) a wake-up signal using the determined WUSmax value as limiting a number of repetitions of the wake-up signal that are transmitted.

Embodiment 30: The method of embodiment 29 wherein the wake-up signal is a signal transmitted by the network node to indicate to a wireless device that the wireless device is to continue to decode a respective channel.

Embodiment 31: The method of embodiment 30 wherein the respective channel is a physical downlink control channel, and the Rmax value defines a maximum number of repetitions used by the network node when transmitting the physical downlink control channel.

Embodiment 32: The method of embodiment 31 wherein the wireless device is an Enhanced Machine Type Communication (eMTC) device, and the physical downlink control channel is a MTC Physical Downlink Control Channel (MPDCCH).

Embodiment 33: The method of embodiment 31 wherein the wireless device is a Narrowband Internet of Things (NB-IoT) device, and the physical downlink control channel is a Narrowband Physical Downlink Control Channel (NPDCCH).

Embodiment 34: The method of any one of embodiments 29 to 33 wherein a default wake-up signal coverage is determined from the default WUSmax value and a preferred wake-up signal coverage is different from the default WUS coverage.

Embodiment 35: The method of embodiment 34 further comprising determining (202) the preferred wake-up signal coverage.

Embodiment 36: The method of embodiment 34 or 35 further comprising determining (204), based on the preferred wake-up signal coverage, at least one wake-up signal delta value, WUSdelta value, related to the default wake-up signal coverage.

Embodiment 37: The method of embodiment 36 further comprising transmitting (206) the at least one WUSdelta value in system information of the network node.

Embodiment 38: The method of any one of embodiments 36 to 37 wherein determining (204) the WUSdelta value comprises determining (204) the WUSdelta value from the Rmax value by mathematical formula.

Embodiment 39: The method of embodiment 38 wherein the mathematical formula is predefined.

Embodiment 40: The method of any one of embodiments 36 to 37 wherein determining (204) the WUSdelta value comprises determining (204) the WUSdelta value from the Rmax value by table lookup.

Embodiment 41: The method of embodiment 40 wherein the table lookup uses a predefined table.

Embodiment 42: The method of any one of embodiments 36 to 41 wherein transmitting (208) the wake-up signal comprises transmitting (208) the wake-up signal using a WUSmax value determined based on the default WUSmax value and the WUSdelta value as limiting a number of repetitions of the wake-up signal that are transmitted.

Embodiment 43: The method of any one of embodiments 29 to 42 wherein determining (200) the default WUSmax value comprises determining (200) the default WUSmax value from the Rmax value by mathematical formula.

Embodiment 44: The method of embodiment 43 wherein the mathematical formula is predefined.

Embodiment 45: The method of any one of embodiments 29 to 42 wherein determining (200) the default WUSmax value comprises determining (200) the default WUSmax value from the Rmax value by table lookup.

Embodiment 46: The method of embodiment 45 wherein the table lookup uses a predefined table.

Embodiment 47: The method of embodiment 46 wherein the WUSdelta value indicates a deviation from the predefined table.

Embodiment 48: The method of any one of embodiments 29 to 47 wherein the preferred WUS coverage is increased due to User Equipments (UEs) using a specific low performance wake-up radio.

Embodiment 49: The method of any of the previous embodiments, further comprising: obtaining user data; and forwarding the user data to a host computer or a wireless device.

Group C Embodiments

Embodiment 50: A wireless device for determining a wake-up signal maximum repetition value, WUSmax value, representing a maximum number of repetitions of a wake-up signal, the WUSmax value being related to a maximum repetition value, Rmax value, representing a maximum number of repetitions of signals transmitted by a network node in a cellular communications network, the wireless device comprising: processing circuitry configured to perform any of the steps of any of the Group A embodiments; and power supply circuitry configured to supply power to the wireless device.

Embodiment 51: A base station for efficiently transmitting information of a wake-up signal maximum length, related to a maximum repetition factor used for other signals, the base station comprising: processing circuitry configured to perform any of the steps of any of the Group B embodiments; and power supply circuitry configured to supply power to the base station.

Embodiment 52: A User Equipment, UE, for determining a wake-up signal maximum repetition value, WUSmax value, representing a maximum number of repetitions of a wake-up signal, the WUSmax value being related to a maximum repetition value, Rmax value, representing a maximum number of repetitions of signals transmitted by a network node in a cellular communications network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; and a battery connected to the processing circuitry and configured to supply power to the UE.

Embodiment 53: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 54: The communication system of the previous embodiment further including the base station.

Embodiment 55: The communication system of the previous 2 embodiments, further including the UE, wherein the UE is configured to communicate with the base station.

Embodiment 56: The communication system of the previous 3 embodiments, wherein: the processing circuitry of the host computer is configured to execute a host application, thereby providing the user data; and the UE comprises processing circuitry configured to execute a client application associated with the host application.

Embodiment 57: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 58: The method of the previous embodiment, further comprising, at the base station, transmitting the user data.

Embodiment 59: The method of the previous 2 embodiments, wherein the user data is provided at the host computer by executing a host application, the method further comprising, at the UE, executing a client application associated with the host application.

Embodiment 60: A User Equipment, UE, configured to communicate with a base station, the UE comprising a radio interface and processing circuitry configured to perform the method of the previous 3 embodiments.

Embodiment 61: A communication system including a host computer comprising: processing circuitry configured to provide user data; and a communication interface configured to forward the user data to a cellular network for transmission to a User Equipment, UE; wherein the UE comprises a radio interface and processing circuitry, the UE's components configured to perform any of the steps of any of the Group A embodiments.

Embodiment 62: The communication system of the previous embodiment, wherein the cellular network further includes a base station configured to communicate with the UE.

Embodiment 63: The communication system of the previous 2 embodiments, wherein: the processing circuitry of the host computer is configured to execute a host application, thereby providing the user data; and the UE's processing circuitry is configured to execute a client application associated with the host application.

Embodiment 64: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 65: The method of the previous embodiment, further comprising at the UE, receiving the user data from the base station.

Embodiment 66: A communication system including a host computer comprising: a communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 67: The communication system of the previous embodiment, further including the UE.

Embodiment 68: The communication system of the previous 2 embodiments, further including the base station, wherein the base station comprises a radio interface configured to communicate with the UE and a communication interface configured to forward to the host computer the user data carried by a transmission from the UE to the base station.

Embodiment 69: The communication system of the previous 3 embodiments, wherein: the processing circuitry of the host computer is configured to execute a host application; and the UE's processing circuitry is configured to execute a client application associated with the host application, thereby providing the user data.

Embodiment 70: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 71: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 72: The method of the previous embodiment, further comprising, at the UE, providing the user data to the base station.

Embodiment 73: The method of the previous 2 embodiments, further comprising: at the UE, executing a client application, thereby providing the user data to be transmitted; and at the host computer, executing a host application associated with the client application.

Embodiment 74: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 75: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 76: The communication system of the previous embodiment further including the base station.

Embodiment 77: The communication system of the previous 2 embodiments, further including the UE, wherein the UE is configured to communicate with the base station.

Embodiment 78: The communication system of the previous 3 embodiments, wherein: processing circuitry of the host computer is configured to execute a host application; and the UE is configured to execute a client application associated with the host application, thereby providing the user data to be received by the host computer.

Embodiment 79: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 80: The method of the previous embodiment, further comprising at the base station, receiving the user data from the UE.

Embodiment 81: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BW Bandwidth
CE Coverage Enhancement
CP Cyclic Prefix
CPU Central Processing Unit
dB Decibel
DRX Discontinuous Reception
DSP Digital Signal Processor
DTX Discontinuous Transmission
eDRX Extended Discontinuous Reception
eMTC Enhanced Machine Type Communication
eNB Enhanced or Evolved Node B
FFS For Further Study
FPGA Field Programmable Gate Array
GTS Go-To-Sleep Signal
gNB New Radio Base Station
Hz Hertz
ID Identifier
IoT Internet of Things
LTE Long Term Evolution
M2M Machine-to-Machine
MCL Minimum Coupling Loss
MME Mobility Management Entity
MPDCCH MTC Physical Downlink Control Channel
MTC Machine Type Communication
NB-IoT Narrowband Internet of Things
NPDCCH Narrowband Physical Downlink Control Channel
NPRACH Narrowband Physical Random Access Channel
NPSS Narrowband Internet of Things Primary Synchronization Signal
NR New Radio
NSSS Narrowband Internet of Things Secondary Synchronization Signal
OTT Over-the-Top
PDCCH Physical Downlink Control Channel
P-GW Packet Data Network Gateway
PO Paging Occasion
PRACH Physical Radom Access Channel
PRB Physical Resource Block PSS Primary Synchronization Signal
PTW Paging Time Window
RAM Random Access Memory
RAN Radio Access Network
RAN1 Radio Access Network Working Group 1
ROM Read Only Memory
RRH Remote Radio Head
s Second
SC Subcarrier
SCEF Service Capability Exposure Function
SF Subframe
SI System Information
SNR Signal to Noise Ratio
SSS Secondary Synchronization Signal
TS Technical Specification
TX Transmit
UE User Equipment
WI Work Item
WUS Wake-Up Signal
ZC Zadoff-Chu Those skilled in the art will recognize improvements and modifications to the embodiments of the present disclosure. All such improvements and modifications are considered within the scope of the concepts disclosed herein.

REFERENCES

[1] RAN1, Chairman's Notes, 3GPP TSG RAN WG1 Meeting #91, Reno, USA, November 2017.
[2] R1-1801481, *Reduced system acquisition time for MTC*, Ericsson, RAN1 #92, Athens, Greece, February 2018.
[3] R1-1720465, *MTC Synchronisation Signal evaluations for efeMTC*, Sony, RAN1 #91, Reno, USA, November 2017.
[4] R1-1720157, *Enhanced PSS Analysis*, Sierra Wireless, RAN1 #91, Reno, USA, November 2017.
[5] R2-1802586, *Wake Up Signal in NB-IoT and MTC*, Ericsson, RAN2 #101, Athens, Greece, February 2018.
[6] TS 36.133, Requirements for support of radio resource management.
[7] TS 36.306, User Equipment (UE) radio access capabilities.

What is claimed is:

1. A method in a wireless device for determining a maximum length of a wake-up signal, WUSmax value, representing a maximum duration of the wake-up signal, the WUSmax value being related to a maximum repetition value, Rmax value, representing a maximum number of repetitions of signals transmitted by a network node in a cellular communications network, the method comprising:
receiving a Rmax value from the network node;
receiving a wake-up signal delta value, WUSdelta value, from the network node;
determining a WUSmax value based on the Rmax value and the WUSdelta value;
attempting to detect a wake-up signal from the network node using the determined WUSmax value;
determining a synchronization method to be used by the wireless device based on the Rmax value and the WUSdelta value; and
attempting to synchronize to the cellular communications network using the determined synchronization method.

2. The method of claim 1, wherein determining the WUSmax value based on the Rmax value comprises determining the WUSmax value from the Rmax value and the WUSdelta value by a mathematical function.

3. The method of claim 2, wherein the mathematical function is predefined.

4. The method of claim 1, wherein determining the WUSmax value based on the Rmax value comprises determining the WUSmax value from the Rmax value and the WUSdelta value by a table lookup.

5. The method of claim 1, wherein determining the WUSmax value based on the Rmax value comprises determining the WUSmax value from the Rmax value and the WUSdelta value such that the WUSmax value is changed from a previous WUSmax value if the WUSdelta value is actually received.

6. The method of claim 1, wherein determining the synchronization method to be used by the wireless device based on the Rmax value and the WUSdelta value comprises:
determining the WUSmax value based on the Rmax value and the WUSdelta value, the WUSmax value representing the maximum duration of the wake-up signal; and
determining the synchronization method to be used by the wireless device based on a comparison of the WUSmax value to a threshold.

7. The method of claim 6, wherein determining the synchronization method to be used by the wireless device based on a comparison of the WUSmax value to a threshold comprises:
comparing the WUSmax value to the threshold;
if the WUSmax value is greater than the threshold, determining that a wake-up signal can be used for synchronization; and
otherwise, determining that another synchronization method is to be used.

8. The method of claim 7, wherein the other synchronization method is a wake-up signal independent synchronization method.

9. The method of claim 6, wherein the threshold is a function of one of a Discontinuous Reception, DRX, and an extended DRX, eDRX, cycle.

10. The method of claim 6, wherein the threshold is a function of one of a Discontinuous Reception, DRX, and an extended DRX, eDRX, cycle such that a shorter one of the DRX and the eDRX cycle results in a lower threshold, and one of a longer DRX and eDRX cycle results in a higher threshold.

11. A wireless device for determining a maximum length of a wake-up signal, WUSmax value, representing a maximum duration of the wake-up signal, the WUSmax value being related to a maximum repetition value, Rmax value, representing a maximum number of repetitions of signals transmitted by a network node in a cellular communications network, the wireless device comprising:
one or more receivers; and
processing circuitry associated with the one or more receivers, the processing circuitry configured to cause the wireless device to:
receive a Rmax value from the network node;
receive a wake-up signal delta value, WUSdelta value, from the network node;
determine a WUSmax value based on the Rmax value and the WUSdelta value; and
attempt to detect a wake-up signal from the network node using the determined WUSmax value;
determining a synchronization method to be used by the wireless device based on the Rmax value and the WUSdelta value; and attempting to synchronize to the cellular communications network using the determined synchronization method.

12. A method in a network node for efficiently transmitting information of a wake-up signal maximum length, related to a maximum repetition factor used for other signals, the method comprising:
  determining a default maximum length of a wake-up signal, WUSmax value, related to a maximum repetition value, Rmax value, used for other signals;
  transmitting a wake-up signal using the determined WUSmax value as limiting a number of repetitions of the wake-up signal that are transmitted;
  a default wake-up signal coverage is determined from the default WUSmax value, and a preferred wake-up signal coverage is different from the default wake-up signal coverage;
  transmitting a wake-up signal delta value, WUSdelta value, from the network node, the WUSdelta value indicating a synchronization method to be used by a wireless device; and
  attempting to synchronize to the cellular communications network using the determined synchronization method.

13. The method of claim 12, further comprising determining the preferred wake-up signal coverage.

14. The method of claim 12, further comprising determining, based on the preferred wake-up signal coverage, at least one wake-up signal delta value, WUSdelta value, related to the default wake-up signal coverage.

15. The method of claim 14, wherein determining the WUSdelta value comprises determining the WUSdelta value from the Rmax value by a mathematical formula.

16. The method of claim 14, wherein determining the WUSdelta value comprises determining the WUSdelta value from the Rmax value by table lookup.

17. The method of claim 14, wherein transmitting the wake-up signal comprises transmitting the wake-up signal using a WUSmax value determined based on the default WUSmax value and the WUSdelta value as limiting a number of repetitions of the wake-up signal that are transmitted.

18. A network node for efficiently transmitting information of a wake-up signal maximum length, related to a maximum repetition factor used for other signals, the network node comprising:
  processing circuitry configured to cause the network node to:
    determine a default maximum length of a wake-up signal, WUSmax value, related to a maximum repetition value, Rmax value, used for other signals;
    transmit a wake-up signal using the determined WUSmax value as limiting a number of repetitions of the wake-up signal that are transmitted, a default wake-up signal coverage being determined from the default WUSmax value, and a preferred wake-up signal coverage being different from the default wake-up signal coverage;
    transmit a wake-up signal delta value, WUSdelta value, from the network node, the WUSdelta value indicating a synchronization method to be used by a wireless device; and
    attempt to synchronize to the cellular communications network using the determined synchronization method.

* * * * *